(12) United States Patent
Rejaie et al.

(10) Patent No.: US 12,248,477 B2
(45) Date of Patent: Mar. 11, 2025

(54) METHOD FOR DYNAMIC RESOURCE SCHEDULING OF PROGRAMMABLE DATAPLANES FOR NETWORK TELEMETRY

(71) Applicants: University of Oregon, Eugene, OR (US); Niksun Inc, Princeton, NJ (US)

(72) Inventors: Reza Rejaie, Eugene, OR (US); Ramakrishnan Durairajan, Eugene, OR (US); Christopher H. Misa, Eugene, OR (US); Walter Willinger, Madison, NJ (US)

(73) Assignees: University of Oregon, Eugene, OR (US); Niksun Inc, Princeton, NJ (US)

( * ) Notice: Subject to any disclaimer, the term of this patent is extended or adjusted under 35 U.S.C. 154(b) by 0 days.

(21) Appl. No.: 18/097,147

(22) Filed: Jan. 13, 2023

(65) Prior Publication Data

US 2023/0161769 A1     May 25, 2023

Related U.S. Application Data

(63) Continuation-in-part of application No. 17/955,340, filed on Sep. 28, 2022, now abandoned.
(Continued)

(51) Int. Cl.
*G06F 16/2455* (2019.01)
*G06F 9/48* (2006.01)
(Continued)

(52) U.S. Cl.
CPC ...... *G06F 16/24556* (2019.01); *G06F 9/4881* (2013.01); *G06F 16/24578* (2019.01); *G06F 16/2462* (2019.01); *H04L 43/08* (2013.01)

(58) Field of Classification Search
CPC ......... G06F 16/24556; G06F 16/24578; G06F 16/2462; G06F 9/4881; H04L 43/08
See application file for complete search history.

(56) References Cited

U.S. PATENT DOCUMENTS 11,516,308 B1 *  11/2022  Dubynskiy .........  G06F 11/3457
2002/0030604 A1 *  3/2002  Chance ....................  H04Q 9/00
                                                                  340/870.11
(Continued)

OTHER PUBLICATIONS

Chowdhury, et al., Payless: a low cost network monitoring framework for software defined networks, in: Proceedings of the 14th IEEE/IFIP Network Operations and Management Symposium, NOMS'14, May 2014.
(Continued)

*Primary Examiner* — Jensen Hu
(74) *Attorney, Agent, or Firm* — LUMEN PATENT FIRM

(57) ABSTRACT

A method for network dataplane telemetry includes: a) receiving telemetry queries, where each query includes a requested network telemetry task, and associated query result accuracy and query result latency weights; b) every epoch, scheduling the telemetry queries to produce a schedule associating to each sub-epoch of an epoch for a subset of the telemetry queries; c) every sub-epoch, reprogramming a programmable dataplane device to execute scheduled telemetry queries associated the sub-epoch; d) every sub-epoch, collecting and aggregating intermediate query results from the programmable dataplane device; e) every epoch, returning aggregated results of completed queries; wherein scheduling the telemetry queries uses a multi-objective optimization that uses multiple objective functions weighted by the query result accuracy and query result latency weights to balance resource requirements of the runtime programmable network switch, query result accuracy, and query result latency.

4 Claims, 15 Drawing Sheets

Related U.S. Application Data

(60) Provisional application No. 63/249,798, filed on Sep. 29, 2021.

(51) Int. Cl.
  G06F 16/2457 (2019.01)
  G06F 16/2458 (2019.01)
  H04L 43/08 (2022.01)

(56) References Cited

U.S. PATENT DOCUMENTS

| | | | |
|---|---|---|---|
| 2008/0033920 A1* | 2/2008 | Colclasure | G06F 16/2453 |
| 2009/0271385 A1* | 10/2009 | Krishnamoorthy | G06F 16/24532 707/999.005 |
| 2011/0153662 A1* | 6/2011 | Stanfill | G06F 16/24532 707/774 |
| 2015/0169684 A1* | 6/2015 | Li | G06F 16/24557 707/718 |
| 2018/0278500 A1* | 9/2018 | Feamster | H04L 43/20 |
| 2019/0354621 A1* | 11/2019 | Wang | G06F 16/2453 |
| 2020/0050607 A1* | 2/2020 | Pal | G06F 16/24549 |
| 2021/0216557 A1* | 7/2021 | Danilov | G06F 16/24568 |

OTHER PUBLICATIONS

Malboubi, et al., "Intelligent SDN based traffic (de) aggregation and measurement paradigm (iSTAMP)," in Proc. IEEE Conf. Comput. Commun. (INFOCOM), Apr./May 2014, pp. 934-942.

Yu et al., Software defined traffic measurement with opensketch. 10th USENIX Symposium on Networked Systems Design and Implementation, NSDI'13, vol. 13, Apr. 2013, pp. 29-42.

Gong et al., Towards accurate online traffic matrix estimation in software-defined networks. SOSR '15: Proceedings of the 1st ACM SIGCOMM Symposium on Software Defined Networking Research. Jun. 2015 Article No. 26 pp. 1-7.

Bifulco et al., A Survey on the Programmable Data Plane: Abstractions, Architectures, and Open Problems. 2018 IEEE 19th Int'l Conf. High Performance Switching and Routing (HPSR). Jun. 18-20, 2018.

Jin, Xin. Dynamic control of software-defined networks. Princeton University ProQuest Dissertations Publishing, 2016. 10167500.

Huang et al., Software-Defined Label Switching: Scalable Per-flow Control in SDN. 2018 IEEE/ACM 26th International Symposium on Quality of Service (IWQoS). Jun. 4-6, 2018.

Wang et al., Martini: Bridging the Gap between Network Measurement and Control Using Switching ASICs. 26th IEEE International Conference on Network Protocols (ICNP 2020). Jan. 1, 2020.

Mijumbi et al., Dynamic Resource Management in SDN-based Virtualized Networks. Conference: In Proceedings of the First International Workshop on Management of SDN and NFV Systems (SDN/NFV 2014). Nov. 2014.

Soursouri et al., Adaptive Resource Allocation for Software Defined Networking Controllers. Journal of High Speed Networks. vol. 23. Issue 3. 2017 pp. 237-253.

Vestin et al., Programmable Event Detection for In-Band Network Telemetry. Conference: IEEE CloudNet 2109. Sep. 2019.

Zhou et al., Flow Event Telemetry on Programmable Data Plane. SIGCOMM '20: Proc. ACM Special Interest Group on Data Comm. on the applications, technologies, architectures, and protocols. Jul. 2020 pp. 76-89.

BroadCom: Silicon innovations in programmable switch hardware. Apr. 27, 2020. Retrieved Jan. 2023 from URL www.broadcom.com/blog/silicon-innovations-in-programmable-switch-hardware.

BroadCom: Broadcom's new Trident 4 and Jericho 2 switch devices offer programmability at scale. Jun. 27, 2019. Retrieved Jan. 2023 from URL www.broadcom.com/blog/trident4-and-jericho2-offer-programmability-at-scale.

NPL: Open, High-Level language for developing feature-rich solutions for programmable networking platforms. Retrieved Jan. 2023 from URL nplang.org.

Oliver Michel, Packet-Level Network Telemetry and Analytics. Dissertation from Univ. Colorado. 2019. Retrieved Jan. 2023 from olivermichel.github.io/doc/dissertation.pdf.

Barefoot Networks Advanced Data-Plane Telemetry. Dec. 2018. Retrieved Jan. 2023 from URL opennetworking.org/wp-content/uploads/2018/12/Data-Plane-Telemetry-ONF-Connect-Public.pdf.

Misa, C. Cedar: A Reconfigurable Data Plane Telemetry System. 2020. Retrieved Jan. 2023 from URL www.cs.uoregon.edu/Reports/DRP-202002-Misa.pdf.

Zhou et al. Newton: intent-driven network traffic monitoring. CoNEXT '20: Proceedings of the 16th International Conference on emerging Networking EXperiments and TechnologiesNov. 2020 pp. 295-308.

Yang et al., Elastic Sketch: Adaptive and Fast Network-wide Measurements. SIGCOMM '18: Proceedings of the 2018 Conference of the ACM Special Interest Group on Data Communication. Aug. 2018 pp. 561-575.

Huang et al. SketchVisor: Robust Network Measurement for Software Packet Processing. SIGCOMM '17: Proceedings of the Conference of the ACM Special Interest Group on Data Communication. Aug. 2017 pp. 113-126.

\* cited by examiner

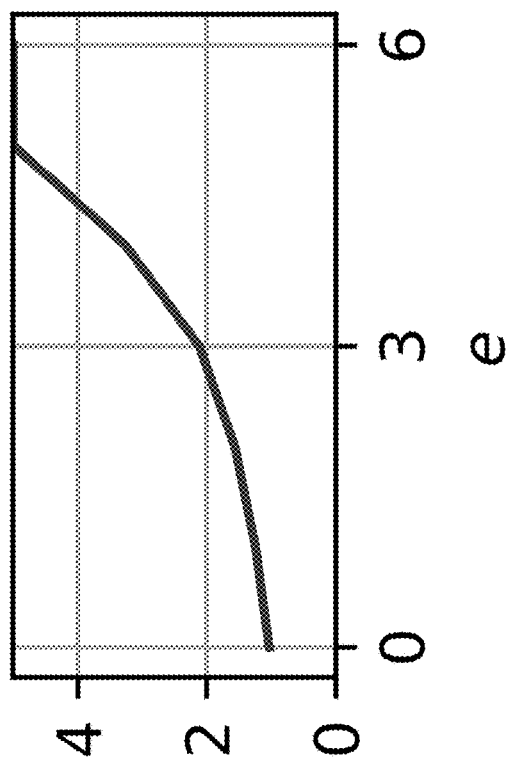
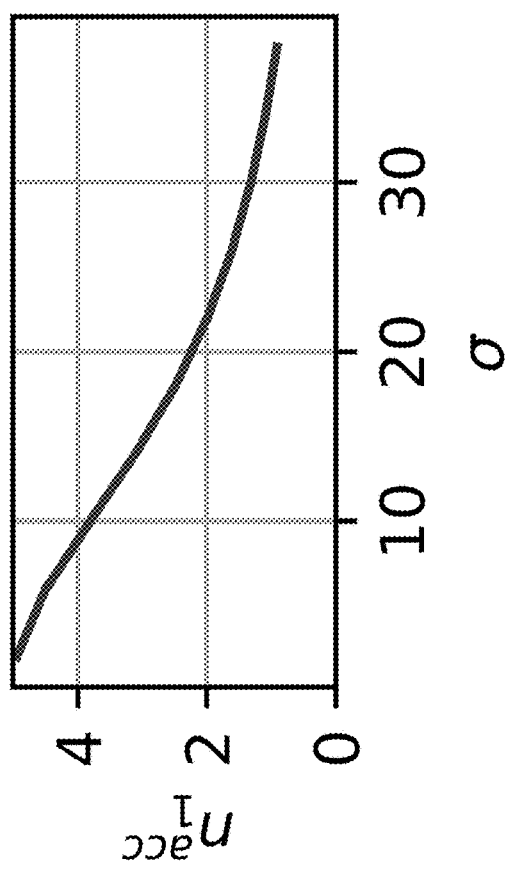
*Fig. 13A*
*Fig. 13B*

METHOD FOR DYNAMIC RESOURCE SCHEDULING OF PROGRAMMABLE DATAPLANES FOR NETWORK TELEMETRY

CROSS-REFERENCE TO RELATED APPLICATIONS

This application is a continuation-in-part of U.S. patent application Ser. No. 17/955,340 filed Sep. 28, 2022, which claims priority from U.S. Provisional Patent Application 63/249,798 filed Sep. 29, 2021, both of which are incorporated herein by reference.

STATEMENT REGARDING FEDERALLY SPONSORED RESEARCH OR DEVELOPMENT

This invention was made with Government support under contract CNS 1850297 awarded by the National Science Foundation. The Government has certain rights in the invention.

FIELD OF THE INVENTION

The invention relates generally to techniques for data-plane telemetry and adaptive management of network switch resources for monitoring and gathering network traffic statistics.

BACKGROUND OF THE INVENTION

Modern network switches are programmable, in particular these switches can be programmed to perform monitoring operations on selected collections of network flows/connections in real time. These monitoring operations capture desired features/characteristics of the selected collection of flows (e.g., number of new connections in the network per second) and periodically reports the selected features to a separate server in the network, called a collector. The collector uses these reported features to infer whether/when a particular event (e.g., network attack, performance anomaly) takes place on the network. This technique is called data plane telemetry measuring traffic features within the data plane and relay them to other places to be used for network management. Furthermore, each telemetry task often has multiple steps/phases that progressively examines different traffic features to examine certain condition before they move to the next step/phase and consider a different set of features.

A network operator interested in certain type of attacks has to perform the required monitoring operations on a modern switch in the network to capture relevant traffic features as input for the event detection algorithm that is run at the collector. To run multiple network management tasks concurrently, a separate set of operations are run for each task on the switch to capture their required traffic features. The switch has limited resources (e.g., memory) to accommodate concurrent telemetry operations. Thus switch resources often limits how many operations can be run on a switch at the same time.

There are two type of modern switches. The first type can be programmed just once (i.e., at compile time) and then operated we call these programmable (or compile-time programmable) switches. This is considered the cutting edge of switch technology. To perform data plane telemetry on a programmable switch, one must incorporate/perform all operations (for all steps/phases) of a task on the switch at all times even though all captured features are not needed at the same time as we mentioned earlier. The program that is loaded on the switch should include all operations of all the tasks at the same time. This leads to inefficient/coarse allocation of switch resources that cannot be modified except if we load a new program on the switch which leads to disruption in switch operation and should be done only very infrequently.

The second type of switch is configurable (also called runtime programmable), and such switches have become available more recently. A reconfigurable switch allows us to change the telemetry operations on the fly without rebooting the switch. There are considerable challenges to implementing such an approach on a reconfigurable switch, however.

BRIEF SUMMARY OF THE INVENTION

Network telemetry systems provide critical visibility into the state of networks. While significant progress has been made by leveraging programmable switch hardware to scale these systems to high and time-varying traffic workloads, less attention has been paid towards efficiently utilizing limited hardware resources in the face of dynamics such as the composition of traffic as well as the number and types of queries running at a given point in time. Both these dynamics have implications on resource requirements and query accuracy.

We argue that this dynamics problem motivates reframing telemetry systems as resource schedulers—a significant departure from state-of-the-art. More concretely, rather than statically partition queries across hardware and software platforms, telemetry systems ought to decide on their own and at runtime when and for how long to execute the set of active queries on the data plane. To this end, we describe here an efficient approximation and scheduling algorithm that exposes accuracy and latency tradeoffs with respect to query execution to reduce hardware resource usage. We evaluate our approach by building Dynamic Approximate Telemetry Operation Scheduler (DynATOS), a hardware prototype built around a reconfigurable approach to ASIC programming. We show that our approach is more robust than state-of-the-art methods to traffic dynamics and can execute dynamic workloads comprised of multiple concurrent and sequential queries of varied complexities on a single switch while meeting per-query accuracy and latency goals.

The techniques of the present invention leverage this capability of reconfigurable switch and significantly increase the number of tasks whose operations can be performed on the switch: 1) the reconfigurable switch only performs the required operation for one step/phase of each task at any point of time. Therefore, less resources per task is needed and more operations/tasks can be supported, most importantly 2) the techniques of the present invention enable sharing of switch resources across more operation over time. We use an example to illustrate this. A simple approach to run a task on a configurable switch is as follows: configure the switch to perform operations for the first phase of a task for T second, and obtain the results at the collector, then reconfigure the switch to perform operation for the second phase of the task for period T, etc. The invention proposes to further divide period T into smaller window of time and within that smaller window run operations for a task. The method that manages/schedule switch resources during each time window T is one aspect of the invention. Running the operation for a shorter period of time could affect the accuracy of measured/captured characteristics and this effect depends on the characteristic that is being measured and overall characteristics of network traffic. These pieces of information may not be known ahead of time. Therefore, the resource scheduling scheme are feature-aware and traffic-aware.

These techniques have advantages including: 1) allowing to change on the fly the telemetry tasks that are being performed on the switch, and 2) increasing the number of operations (and thus associated network management tasks) that are performed on the switch by actively managing the limited resources and sharing them between different operations (by leveraging the reconfigurable capability of the switch).

In one aspect, the invention provides a method for network dataplane telemetry, which includes: receiving telemetry queries, where each query includes a requested network telemetry task expressed as a sequence of filter and reduce operators, and associated query result accuracy and query result latency weights; every epoch, scheduling the telemetry queries to produce a schedule assigning a subset of the telemetry queries to each sub-epoch of an epoch; every sub-epoch, reprogramming a programmable dataplane device to execute scheduled telemetry queries assigned to the sub-epoch; every sub-epoch, collecting and aggregating intermediate query results from the programmable dataplane device; and every epoch, returning aggregated results of completed queries; where scheduling the telemetry queries comprises solving a multi-objective optimization problem that uses multiple objective functions weighted by the query result accuracy and query result latency weights.

In preferred embodiments, solving the multi-objective optimization problem concurrently balances a trade-off between query result accuracy and resource requirements of the runtime programmable network switch and balances a trade-off between query result latency and resource requirements of the runtime programmable network switch.

In some preferred embodiments, the programmable dataplane device is a network probe device adapted to generate aggregate traffic features from raw network packets and to allow updating what features and aggregations are generated with minimal latency at runtime.

In some preferred embodiments, the programmable dataplane device is a semi-programmable hardware switching ASIC, fully-programmable hardware switching ASIC, a FPGA programmed to implement a dataplane probe interface, a programmable NIC, a software network switch, or a network device implementing software packet capture.

BRIEF DESCRIPTION OF THE SEVERAL VIEWS OF THE DRAWINGS

FIG. 6A shows DDoS, FIG. 6B shows TCP New Connections, FIG. 6C shows Port Scan, and FIG. 6D shows Super Spreader, according to an embodiment of the invention.

FIG. 9A shows ALU-seconds, and FIG. 9B shows counter-seconds, according to an embodiment of the invention.

FIG. 10A shows 10 records, and FIG. 10B shows $10^5$ records, according to an embodiment of the invention.

FIG. 13A, 13B are graphs illustrating numeric evaluations of Eqs. 7 and 8, where FIG. 13A shows increasing σ reduces $n^{acc}$ in the first epoch, FIG. 13B shows $n^{lat}$ increases as deadline E=6 approaches, according to an embodiment of the invention.

DETAILED DESCRIPTION OF THE INVENTION

Figure 1:
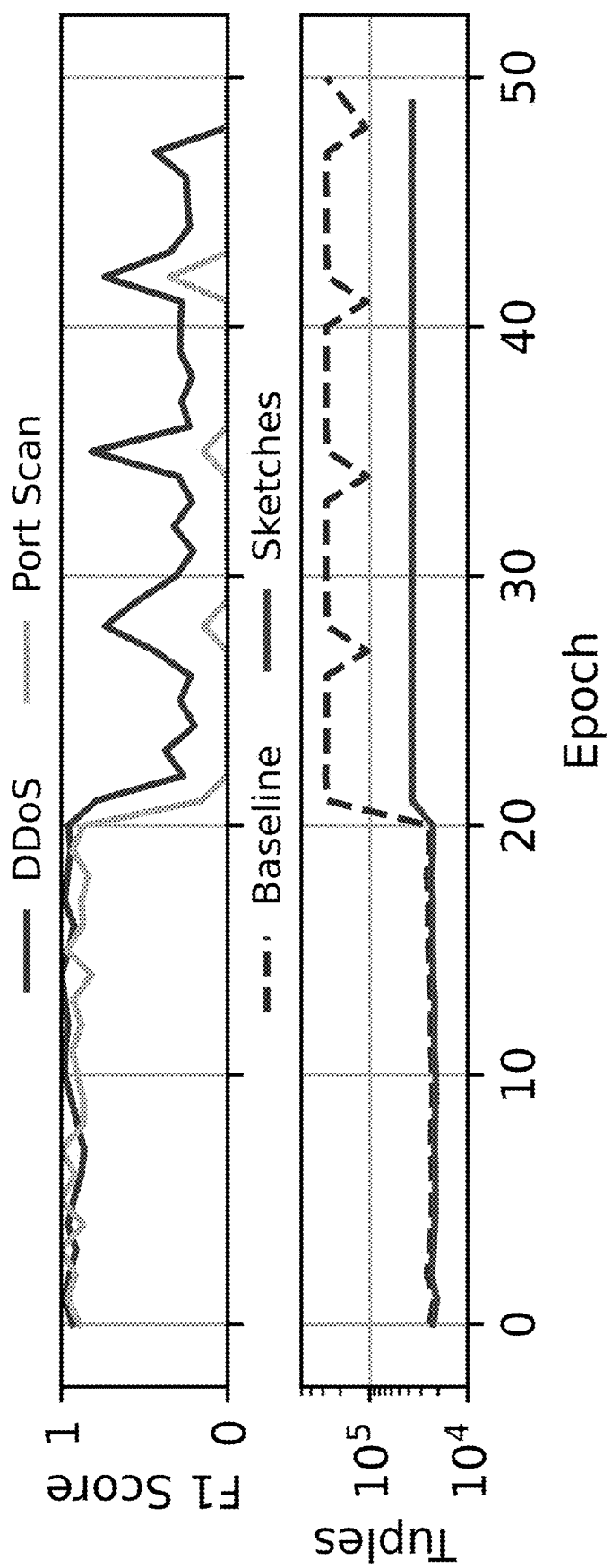
FIG. 1 shows graphs of F1 score and tuples returned to the collector for each epoch, illustrating the accuracy of concurrent DDoS and port scanning queries under extreme traffic dynamics.

Network telemetry systems provide users (e.g., network operators, researchers) with critical insights into the state of the network by collecting information about individual packets and processing this information into high-level features in near real-time. Typically, these features are the results of user-defined queries, where a query is expressed as a sequence of high-level operations such as filter and reduce. Generated query results drive management decisions such as deploying defensive measures in the face of an attack or updating routing to avoid congestion. A key functionality of telemetry systems is to determine how best to leverage available resources (e.g., network hardware resources, such as switch ASICs or NICs; software-programmable resources, such as general-purpose CPUs) to execute a given set of queries. Due to massive traffic volumes and often stringent timing requirements, state-of-the-art telemetry systems typically make use of programmable network hardware (e.g., programmable switch ASICs) and also apply approximation techniques (e.g., sketches).

In executing user-defined queries, telemetry systems must cope with two independent and challenging sources of dynamics. First, the resources required to execute any given query depend on the underlying distributions (i. e., composition) of network traffic. For example, a DDoS-detection query that counts the number of sources contacting each destination might require a counter for each destination active on the network, but the number of active destinations may vary over time. The accuracy guarantees of state-of-the-art approximation techniques like sketches likewise depend on traffic distributions so that if these distributions change, accuracy can no longer be guaranteed. Second, the number and type of concurrent queries submitted by a user can vary over the system's deployment. For example, an operator might need to submit followup queries to pinpoint the root cause of increased congestion. Both these sources of dynamics affect data plane resource usage implying that telemetry systems must dynamically adjust resource allocations.

Several recent efforts have made progress towards coping with both of these sources of dynamics individually and in isolation, but do not address challenges arising from their simultaneous presence in network telemetry systems. For example, ElasticSketch presents a method for dynamically coping with changes in traffic rate and distribution. However, this effort relies on a fixed flow key which forces users to reload the switch pipeline to change queries. On the other hand, Newton describes a technique to update query operations during runtime which enables users to dynamically add and remove queries as their monitoring needs change. However, Newton does not consider the problem of adjusting resource allocations between concurrent queries as traffic composition changes. To the best of our knowledge, no recent work addresses these simultaneous sources of dynamics in an efficient switch hardware based system.

In this work, we propose that, in order to simultaneously address these sources of dynamics, telemetry systems should be reframed as active resource schedulers for query operations. In particular, telemetry systems need to manage finite switch hardware processing resources while adapting to varying numbers and types of queries as well as varying traffic composition. To develop and implement this approach, we make the following key contributions.

Time-division approximation method. Viewing telemetry systems as online schedulers enables a new approximation technique based on time-division approximation. At a high-level, this technique observes that query operations do not need to run all the time. Instead, operations can execute during strategically placed sub-windows of the overall time window (e.g., an operation could execute for 3 of 8 equal-duration sub-windows of a 5 s overall time window). This technique is grounded in cluster sampling theory which allows us to estimate error and future resource requirements.

Adaptive scheduling algorithm. We provide a closed loop
   adaptive scheduling algorithm which leverages time-division approximation to execute operations from many user-defined queries on a single switch ASIC. Our scheduling algorithm leverages multi-objective optimization to balance between multiple high-level goals such as prioritizing accuracy, latency, or reduced volume of reported data across queries.

Evaluation in a functional hardware prototype. To evaluate
   our proposed techniques, we implement DynATOS, a telemetry operation scheduling system which leverages programmable switch hardware to answer dynamically submitted queries. One implementation of DynATOS assumes a single runtime programmable switch hardware capable of executing a restricted number of primitive operations as supported by a telemetry module found in a widely available off-the-shelf switch ASIC. We evaluate DynATOS on our hardware prototype and through simulation showing that (i) time-division approximation is more robust than sketches to changes in traffic dynamics while offering a similar accuracy, overhead tradeoff space, (ii) our adaptive scheduler is able to meet query accuracy and latency goals in the presence of traffic and query dynamics, and (iii) the overheads in our scheduling loop are minimal and dominated by the time required to report and process intermediate results from the switch an overhead which can be mitigated significantly by leveraging fully programmable switch hardware.

Dynamic Telemetry Use Cases

To motivate the techniques of DynATOS, we first consider some example use cases.

EXAMPLE 1

Consider a scenario where a telemetry system is executing the DDoS and port scanning detection tasks described in Sonata (The DDoS task finds destinations receiving from large numbers of distinct sources and the port scanning task finds sources sending to a large number of distinct destination ports). The first stage of these tasks finds a set of distinct elements in each time window or epoch (e.g., IPv4 source, destination pairs every epoch for DDoS). Suppose traffic follows a stable pattern for several epochs with only small changes in the number of distinct elements considered by both tasks and that the telemetry system adjusts resource allocations for these two queries to achieve good accuracy. Now, suppose at some later epoch traffic changes so that a much larger number of sources are seen (either due to a natural event like a flash crowd or due to an actual DDoS attack). This larger number of sources increases the number of pairs that both queries must keep track of and either more resources will need to be allocated or accuracy will suffer.

While this example only considered a pair of queries, in realistic settings operators likely need to monitor for a wide variety of attacks simultaneously (e.g., the 11 queries described in Sonata). Moreover, features like number of sources or destinations commonly overlap in these types of attack detection queries so that an anomalous change in one feature may upset the resource requirements of a large number of simultaneous queries.

EXAMPLE 2

Consider a scenario where a network operator wants to understand the root cause of TCP latency on their network. In this scenario, the operator would like to first run queries to detect when latency increases and for which hosts or subnets. Once detected, the operator must submit a large number of queries to test possible causes of high latency such as re-transmissions or deep queues with filter operations so that these queries only apply to the flows experiencing latency. Note that the debugging phase may require several rounds of querying with tens of simultaneous queries in each round before the root cause of the latency can be determined.

While the above examples focus on two particular tasks, the underlying concepts of dealing with large shifts in query resource requirements caused by changes in traffic and of executing multiple queries over time in a dependent manner—are commonly encountered in network operations.

Ideal Telemetry System Requirements

In light of the above-mentioned examples, an ideal telemetry system should support the following requirements.

R1: Query diversity. Marple and Sonata outline how a small set of parameterized stream processing operators can enable a wide range of telemetry queries. Telemetry systems must support these kinds of generic query description interfaces, allowing filtering over packet header values, grouping by arbitrary header fields, chaining operations, and joining the results of multiple operation chains.

R2: Approximate execution. Executing telemetry queries over the massive volumes of data flowing through networks poses heavy resource requirements. Furthermore, many telemetry queries are equally effective when computed approximately. Therefore, telemetry systems should expose approximation techniques that allow trading off reduced result accuracy for lower resource requirements.

R3: Traffic dynamics. Composition of traffic changes over time, and changes may be slow, regular, and easy to predict (e.g., daily cycles) or fast and hard to predict (e.g., flash crowds). As discussed in Example 1, these changes in traffic composition lead to changes in the resource requirements for different groups of queries. Telemetry systems should robustly handle these changes without compromising query accuracy or latency.

R4: Query dynamics. The queries a network operator needs to run change over time. Some of these changes may be infrequent (e.g., adding new queries to monitor a newly deployed service), while some of these changes may be rapid and time-sensitive (e.g., adding new queries to debug a performance anomaly or to pinpoint and block a network attack). Telemetry systems should be able to handle these dynamic query arrivals and removals, realizing updates within a few milliseconds and without incurring network downtime.

R5: Switch hardware acceleration. Due to massive traffic volumes, stringent timing requirements, and the limited speed of a single CPU core, executing telemetry queries on CPU-based systems is prohibitively expensive. As a result, telemetry systems must leverage resource-constrained hardware targets to accelerate query execution.

State-of-the-Art and Their Limitations

State-of-the-art approaches each satisfy a subset of the requirements set forth above, but face limitations which hinder their ability to satisfy all requirements simultaneously.

Static switch-based approaches. Marple and Sonata compile traffic queries into static hardware description languages like P4, demonstrating the efficiency of switch hardware in computing query results. However, these approaches fail to satisfy R4 since changing queries

TABLE 1

Summary of how different approaches relate to the requirements described in the section on Ideal Telemetry System Requirements.

| Approach | R1 | R2 | R3 | R4 | R5 |
|---|---|---|---|---|---|
| Static switch-based | ✓ | | | | ✓ |
| Runtime-programmable | ✓ | ✓ | | ✓ | ✓ |
| Dynamic allocation | | ✓ | ✓ | ✓ | ✓ |
| Sketch-based | ✓ | ✓ | | | ✓ |
| Software-based | ✓ | ✓ | ✓ | ✓ | |
| DynATOS | ✓ | ✓ | ✓ | ✓ | ✓ | incurs seconds of network downtime.

Runtime-programmable approaches. Recently, BeauCoup and Newton demonstrate techniques to allow network operators to add and remove queries at runtime without incurring downtime. These efforts lay a technical foundation to address R4, but do not address the challenge of R3.

Dynamic allocation approaches. DREAM and SCREAM develop dynamic allocation systems for telemetry operations addressing both R3 and R4.

However, these approaches do not satisfy R1 because they require query-specific accuracy estimators.

Sketch-based approaches. Many telemetry efforts address R2 by leveraging sketches to gather approximate query results under the stringent operation and memory limitations faced in the data plane. However, the accuracy of sketches is tightly coupled to both the resources allocated (e.g., number of hash functions or number of counters) and the underlying composition of traffic (e.g., number of flows) making sketches insufficient for R3 and R4. An exception to this is ElasticSketch which addresses R3 head on by dynamically adapting to varying traffic compositions. However, ElasticSketch fails to address R4 or R1 since flow keys are fixed in the sketch's implementation.

Software-based approaches. Several prior efforts leverage the capabilities of general-purpose CPUs to process traffic queries. For example, Trumpet installs triggers on end hosts, OmniMon and switch pointer share tables between end hosts and switches in network, and SketchVisor and NitroSketch tune sketch-based approximation techniques for virtual switches. While these approaches work well in settings like data centers where all infrastructure is under a single administrative domain, in many settings (e.g., campus or enterprise networks) it is too expensive (in terms of infrastructure cost and/or latency) to pass all packets through software and impractical to instrument end hosts.

Scheduling distributed stream processing operations. Several efforts address the challenge of efficiently scheduling stream processing operations to maximize resource utilization. However, these efforts do not consider the particular types of accuracy and latency constraints encountered in scheduling telemetry operations on switch hardware.

Limitations of current hardware-based approaches. To illustrate the limitations of current static approaches in dealing with R3 and R4, we implement the two queries mentioned in Example 1 and run them over a traffic excerpt from the MAWILab data set which features pronounced traffic dynamics. This excerpt starts with relatively stable traffic, then suddenly, due to an actual DDoS attack or other causes (which we do not claim to identify), around the $20^{th}$ 5 s time window (or epoch) contains a large number of sources sending regular pulses of traffic. We use bloom filters tuned for the initial normal traffic to approximate the lists of distinct pairs required by the first stage of both queries.

FIG. 1 shows the F1 score (computed by comparing with ground truth, the F1 score is a measure of query accuracy defined as the harmonic mean of precision and recall) of these approximate query implementations along with the number of tuples returned to the collector in each epoch. Before the change in number of sources, the approximation methods for both queries return highly accurate results while sending relatively few tuples. However, when the number of sources increases, the approximation accuracy of both queries suffers since the actual number of ground truth tuples (the "Baseline" trace) far exceeds the number each query was tuned for. Taking the static approach in this example shows that when certain events of interest occur, the accuracy of multiple queries can be significantly impacted due to fixed assumptions about traffic composition. Of course, the telemetry system initially could have tuned these queries for the anticipated number of sources, but this would lead to significant wastage of resources under normal traffic conditions and it is hard to know what to tune for without prior knowledge of the anomaly.

Design Challenges

To elucidate why prior efforts fail to meet the requirements put forth in the section on Ideal Telemetry System Requirements, we next describe the following high-level design challenges.

D1: Approximating generic query results. Efforts like Marple and Sonata develop expressive query description languages which map into data plane computation models. However, approximation of query operations is often necessary due to limited data plane resources and massive traffic volumes. It is unclear how state-of-the-art approximation methods can be leveraged to work with queries expressed in languages like Marple or Sonata. As illustrated in the section on, the currently proposed baseline approach of simply replacing stateful reductions in Sonata queries with sketch-based primitives implies prior knowledge of worse-case traffic situations and does not perform well under dynamic traffic scenarios.

D2: Estimating accuracy of approximations. Approximate query results must be accompanied with a sound estimate of their accuracy. This is critical for operators to understand the system's confidence in detecting a particular event or reporting a particular metric and equally critical in dynamic telemetry systems to inform the balance of resources between approximate queries. Prior efforts have made progress towards this goal, but none anticipate accuracy estimation for current state-of-the-art generic query descriptions.

D3: Allocating finite hardware resources among variable sets of queries under traffic dynamics. Very few prior efforts address the need of a telemetry system to evaluate multiple concurrent queries on finite hardware resources. In order to handle traffic dynamics, such a system must dynamically update resource allocations based on the estimated accuracy of each query. Moreover, since it is possible that the given resources will be insufficient to meet the accuracy of all queries, such a system must enable operators to express query priorities and allocate resources with respect to these priorities.

System Design Overview

Figure 2:
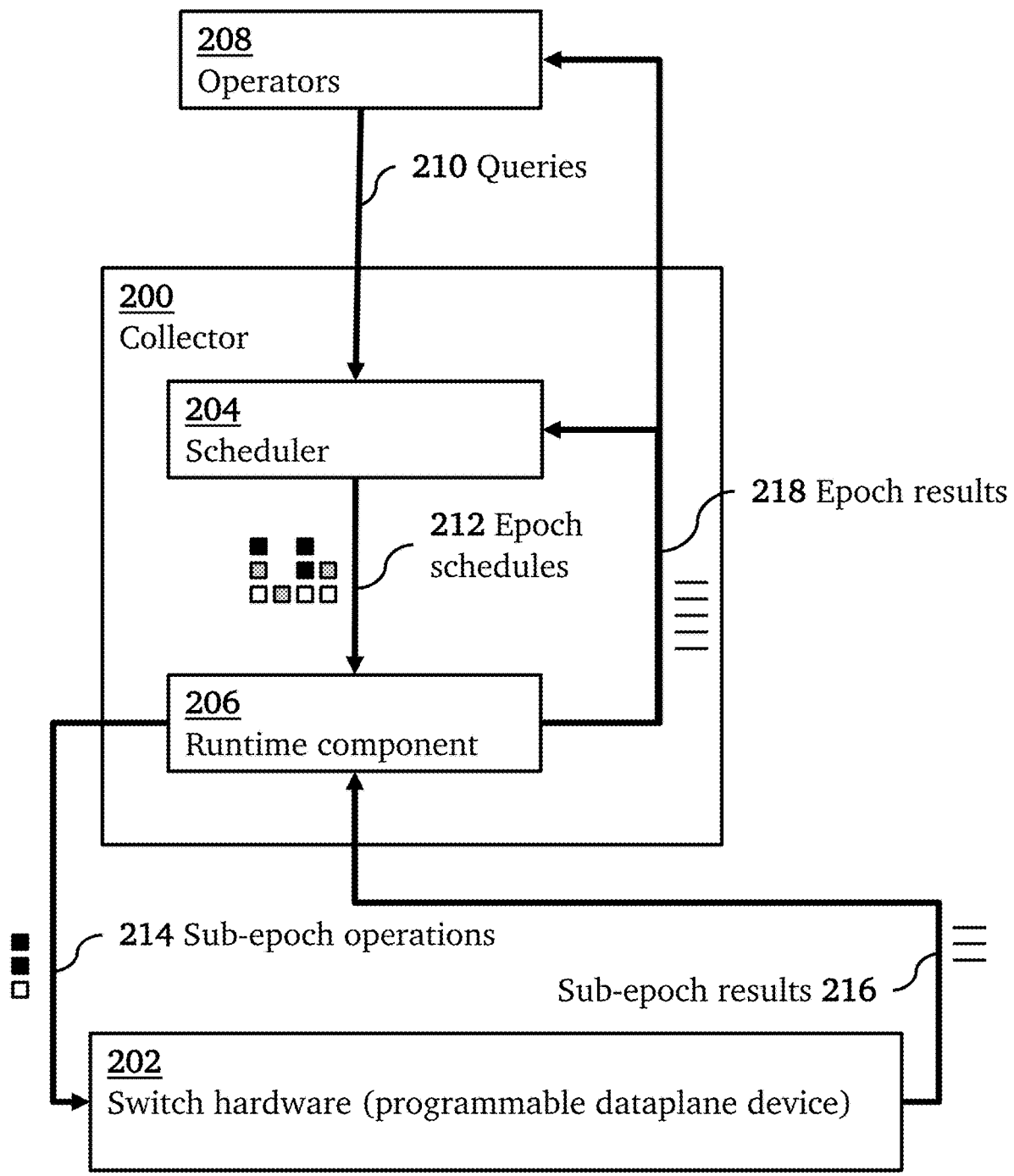
FIG. 2 is a schematic block diagram illustrating the architecture of DynATOS, according to an embodiment of the invention.

In one embodiment, DynATOS is composed of a collector device 200 and switch hardware 202, as shown in FIG. 2. The collector 200 implements a scheduler 204 and runtime component 206 using hardware such as a x86 CPU (e.g., Intel Xeon Gold 5218 CPU running at 2.3 GHz with 383 GB memory). The switch hardware 202 is a programmable dataplane device which may be implemented, for example, using (BroadScan 3.0) ASICs such as BCM56470 A0's (https://docs.broadcom.com/doc/56470-PB).

Network operators 208 submit telemetry queries 210 to the scheduler 204 through a high-level REST API which performs initial query validation and returns a status message along with a description of the expected query result format. The scheduler 204 translates queries 210 into their primitive operations and constructs schedules 212 for how these operations should be run on switch hardware 202. These schedules 212 are handed to a runtime component 206 which generates primitive sub-epoch operations 214 and communicates these to switch hardware 202 to execute the primitive operations 214. The runtime component 206 collects intermediate sub-epoch results 216 from the switch hardware 202. The runtime component 206 gathers all results from the switch hardware 202 and passes consolidated epoch results 218 back to the scheduler 204 and to the operators 208.

Preliminaries

Scheduling horizon. Since queries can arrive at any time, we must decide when and for how far into the future resources should be scheduled. We first examine several possible approaches to this problem, then describe our approach in the next paragraph. One option is to compute the schedule each time a new query arrives and adjust all existing queries to the new schedule. While this option minimizes the time a query has to wait before it can start executing, it complicates the realization of accuracy and latency goals since the duration of the scheduling horizon (i.e., until the next query arrives) is unknown when forming the schedule. Alternatively, we could compute the new schedule each time all queries in the prior schedule terminate. While this option ensures schedules can be executed exactly as planned, newly submitted queries may experience a longer delay.

Figure 3:
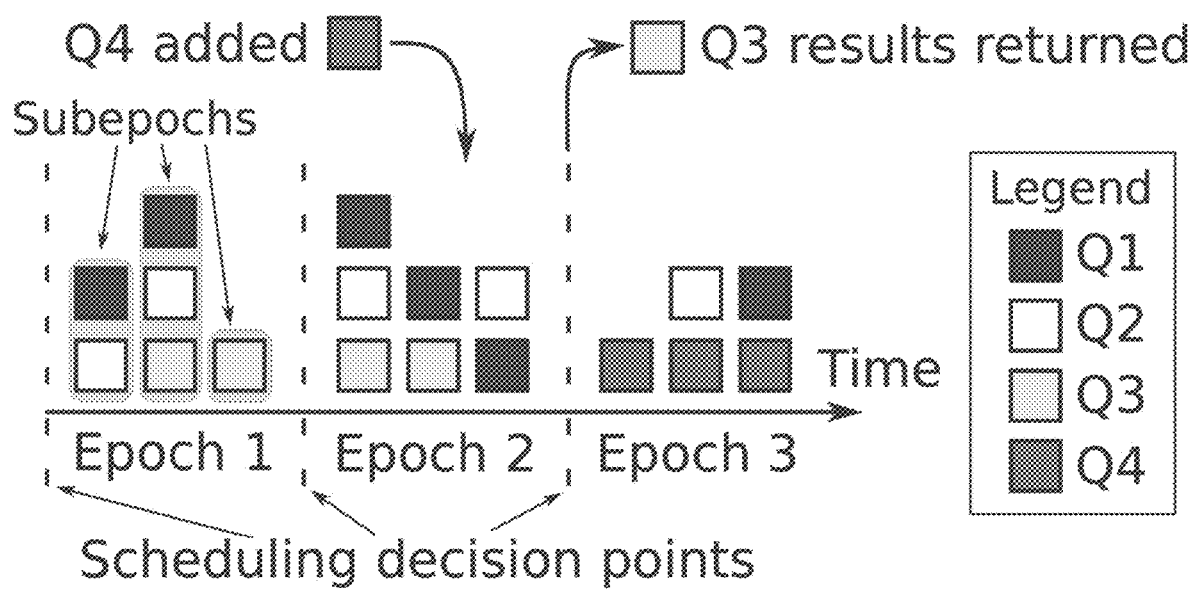
FIG. 3 is a diagram illustrating an example of scheduling four queries with N=3 subepochs per epoch, according to an embodiment of the invention.

We choose, instead, to make scheduling decisions at fixed windows of time which we call epochs (e.g., every 5 s). This allows a balance between the two schemes mentioned above: queries must wait at most the duration of one epoch before executing and during an epoch queries are ensured to execute according to the schedule. In particular, we divide the scheduling epoch into N subepochs and our scheduler assigns subsets of the submitted queries to each subepoch. FIG. 3 illustrates an example showing three epochs, each subdivided into three subepochs each, where each subepoch may be scheduled with any of four queries Q1, Q2, Q3, Q4. Subepochs provide flexibility to schedule different queries at different times while also providing concrete resource allocation units. Queries submitted during an epoch are checked for feasibility and only considered in the following epoch. For example, in the figure, query Q4 is added sometime during epoch 2, but cannot be scheduled until epoch 3. During the epoch, the scheduler collects intermediate results for each subepoch in which a query is executed and aggregates these subepoch results based on the query's aggregation operation. Once an epoch completes, results of complete queries are returned, while new and incomplete queries are considered for the next epoch. For example, in FIG. 3 query Q3 completes execution in the second subepoch of epoch 2 and its results are returned during the scheduler invocation before epoch 3. We further assume that each query executes over traffic in a single epoch and telemetry tasks requiring longer measurement durations than our scheduling epoch can simply re-submit queries.

Key Ideas

We develop a novel approximation method to address the challenge of gathering approximate results for generic queries (D1). In particular, our method leverages cluster sampling theory to estimate the results of the first aggregation operator in multistage queries. For example, in the DDoS query we only approximate computation of the distinct source, destination pairs list and execute all subsequent operations exactly. The intuition behind this is that each operator in a telemetry query tends to reduce the volume of data passed to the next operator. Therefore, reducing the resource requirements and volume of data emitted from the first aggregation reduces the load on all subsequent operators.

The section on Time-Division Approximation describes how our approximation method can provide sound estimates of result accuracy without prior assumptions about traffic characteristics (addressing D2). Note that the accuracy estimates used in many sketch methods are dependent on traffic characteristics (which can be estimated by auxiliary queries or offline analysis). Our method, on the other hand, uses cluster sampling to estimate result accuracy based on observations from a single epoch independently of traffic characteristics. Moreover, by leveraging observations of feature variance in prior epochs, we can predict resource requirements for a desired accuracy level in future epochs. This feedback loop allows our system to dynamically adjust per-query allocations as traffic distributions change.

To address D3, we integrate our approximation technique in a scheduler that determines how a number of concurrent queries should be executed on a single switch hardware, balancing resources between queries to satisfy accuracy and latency goals set by operators. As described in the Scheduling section, our scheduler uses a novel multi-objective optimization formulation of the problem of when to run which queries given query priorities and resource constraints. This formulation allows the scheduler to balance between the goals of multiple concurrent queries, sometimes allocating less than the exact number of subepochs when queries have lower priority and resources are scarce (e.g., due to a large number of concurrent queries).

Finally, we develop a runtime system leveraging these ideas to efficiently execute schedules on switch hardware, gather intermediate results, apply factors to correct for sampling, and return results to network operators in a high-level format. Operators can then decide to execute new queries in the subsequent epoch, or to re-execute the current queries based on these results.

Assumptions

Monitoring problems addressed by DynATOS. The types of traffic features which can be monitored by queries in DynATOS are subject to the following assumptions.

Feature values do not fluctuate excessively over measurement durations of one or two seconds.

The monitoring task can be implemented using features gathered at a single point in the network.

Features are constructed from packet header fields and/or other switch-parsable regions of the packet.

Features can be computed using atomic filter, map, and reduce operations.

Under these assumptions monitoring tasks like detecting microbursts, identifying global icebergs, and detecting patterns in TCP payloads cannot be efficiently executed using DynATOS. However, as evidenced by the body of prior efforts with similar assumptions, DynATOS can still be used for a wide variety of useful tasks.

Switch hardware model. In the following, we assume a restricted runtime programmable switch hardware model. In this model, switch hardware is able to execute a fixed set of Sonata operators, in particular, a filter operator followed by a reduce operator. However, similar to Newton, our switch hardware allows arbitrary parameterization of these operators at run-time. For example, switch hardware could execute the filter and reduce commands required by the Sonata TCP new connections queries for a period of time, then quickly (e.g., within a few milliseconds) be re-programmed to execute the filter and reduce commands required by the Sonata DDoS query.

We note that our scheduling methods are independent of this particular switch hardware model and could readily be applied to more fully programmable ASICs.

Network-wide scheduling. Ultimately, operators need to query traffic across different logical or physical domains of their network. This implies that telemetry systems should collect information from a distributed set of switches (or other monitoring points) and provide a global view of network traffic. In this description, we consider only a single monitoring point (e.g., a critical border switch). However, the inventors envision generalization of these techniques to distributed scheduling of telemetry operations. Nonetheless, a single switch deployment on a enterprise or data center border switch can still be highly effective in executing the types of queries considered.

Time-Division Approximation in DynATOS

Accuracy tradeoff Given fixed scheduling epochs, we can trade off accuracy for reduced resource requirements by sampling a subset of the subepochs in which to execute a particular query. We leverage cluster sampling theory to expose this tradeoff while maintaining accuracy goals. Cluster sampling is a good fit for situations like dynamically scheduled query operations where the cost of sampling large groups of the population (i.e., subepochs) is significantly lower than the cost of sampling individual population members (i.e., packets). In particular, we assume sending the aggregate results (computed in switch hardware) of each sampled subepoch to software is cheaper than sending individual sampled packets to software.

Consider the case where a particular query executes in n of the N total subepochs and let $t_{i,j}$ be the query's result in the i-th subepoch of the j-th epoch, $n_j$ be the number of subepochs in which the query executed in the j-th epoch, E be the total number of epochs in which the query is executed, and $s_{t_j}^2$ be the sample variance of the $t_{i,j}$'s in the j-th epoch. We use the unbiased estimator (see the Appendix for a full discussion of the derivation of these equations from cluster sampling theory), $$\hat{t}_E = \frac{1}{E}\sum_{j=1}^{E}\hat{t}_j = \frac{1}{E}\sum_{j=1}^{E}\frac{N}{n_j}\sum_{i \in S_j} t_{i,j} \qquad (1)$$

which has standard error $$SE(\hat{t}_E) = \frac{N}{E}\sqrt{\sum_{j=1}^{E}\left(1 - \frac{n_j}{N}\right)\frac{s_{t_j}^2}{n_j}} \qquad (2)$$

to estimate query results and determine when accuracy goals have been fulfilled. We rearrange Equation 2 as $$n^{acc} = \frac{s_{t_E}^2 N^2}{E^2 \sigma^2 - \left(\sum_{j=1}^{E}\text{Var}(\hat{t}_j)\right) + N s_{t_E}^2} \qquad (3)$$

to estimate the number of subepochs in which a query should execute in the E-th epoch to fulfill a given standard error target $\sigma$ assuming the query has already executed in the previous E−1 epochs without fulfilling $\sigma$. Note that if $\sigma=0$, then $n^{acc}=N$ and the query will be executed in all of the subepochs in its first epoch. As σ increases, $n^{acc}$ decreases freeing more of the subepochs for other queries.

Latency tradeoff. In addition to the accuracy tradeoff discussed above, we can tradeoff result latency for reduced resource requirements by executing a query's operations across several epochs. The key observation enabling this tradeoff is that by spreading the sampled subepochs over several epochs, the query can reduce its per-epoch requirements while still attaining its accuracy goal. Operators leverage this tradeoff by specifying larger latency goals on queries that do not require fast returns.

Suppose a particular query has a latency goal of $\tilde{E}$ epochs. We need to estimate the number of subepochs in which the query should be allocated $n^{lat}$ in the e-th epoch with $1 \le e \le \tilde{E}$. First, we break the sum in Equation 2 into past ($1 \le j < e$) and future ($e < j \le \tilde{E}$) components. We then have, $$n^{lat} = \frac{s_{t_E}^2 N^2}{E^2 \sigma^2 - N^2(\text{past} + \text{future}) + N s_{t_E}^2} \quad (4)$$

While the past component can be calculated directly using observations from prior epochs, the future component must be estimated based on the number of subepochs the query expects to receive in future epochs. Operators can tune this expected number of subepochs based on current and expected query workloads.

Correcting distinct operators. While the previous sections discuss foundations for making sound approximations of packet/byte counts, many useful queries also involve identifying and counting distinct elements. We leverage the Chao estimator without replacement to correct estimates of a common class of distinct count queries such as the DDoS query considered above in the section on Dynamic Telemetry Use Cases. Similar to the cluster sampling estimators described in this section, the Chao estimator can be used to obtain point and standard error estimates based only on the observed sample.

Scheduling Optimization Formulation

We cast the task of generating query schedules as an optimization problem and adapt well-known techniques to generate schedules through this casting. While this section details our casting of the problem, the section on Challenges of Online Optimization describes the challenges inherent in applying optimization techniques in a real-time setting such as ours.

We apply our optimization formulation every epoch to determine which queries should execute in each of the N subepochs as shown in Algorithm 1. First, in line 2 we use the DISENTANGLE method of Yuan et al. to break the submitted queries Q into disjoint traffic slices K and save the mapping between queries and slices in $s_{i,k}$. Line 3 then computes the minimum number of stateful update operations required by the reduce operators of all queries in each particular slice. These steps are crucial given our single-stage switch hardware model. Next, lines 4 through 6 compute estimates of the memory and subepoch requirements of each query. Finally line 7 creates and solves the optimization problem described below. If a feasible solution cannot be found, line 9 falls back to a heuristic scheduling method described in the section on Challenges of Online Optimization.

```
Algorithm 1 Method for determining subepoch schedule

1: procedure GET-SCHEDULE(Q, u, SE)
 2:     K, s ← DISENTANGLE(Q)
 3:     U ← COMBINE-UPDATES(u, K, s)
 4:     m ← ESTIMATE-MEMORY
 5:     n^acc ← EQUATION 3(σ)
 6:     n^lat ← EQUATION 4(σ, E)
 7:     d ← SOLVE-OPTIMIZATION
 8:     if d is infeasible then
 9:         d ← GET-HEURISTIC-SCHEDULE
10:     end if
11: end procedure
```

Inputs. Table 2 shows the particular inputs and outputs of this optimization problem. Of the input variables, $t_k$, $u_i$, $s_{i,k}$, T, A, and M are known exactly based on submitted query requirements and available switch resources, while $m_i$, $n_i^{acc}$, and $n_i^{lat}$ must be estimated based on observation of past epochs. Our current implementation uses EWMA to estimate $m_i$ and $s_{t_E}^2$ (as required by $n_i^{acc}$ and $n_i^{lat}$) independently for all update operation types. Scheduling decisions are encoded in the $d_{i,j}$ indicator variables which determine which queries should execute in each subepoch. We do not consider the division of switch memory between queries since memory is dynamically allocated during the aggregation operation.

Constraints. We impose the constraints shown in Table 3 to satisfy two high-level requirements: (i) respecting switch resource limits (C1, C2, C3) and (ii) forcing minimal progress in each query and ensuring variance estimates are well-defined (C4). Note that C2 captures the fact that if two queries rely on the same update operation, they can be merged to use a single ALU. In the case that the estimated quantity $m_i$ turns out to be violated by traffic conditions in the subsequent epoch, we simply drop new aggregation groups once the available switch memory is totally consumed.

Objectives. In computing the schedule of each epoch, we consider the objective functions listed in Table 4. O1 seeks to satisfy accuracy goals by minimizing the distance to the value of $n^{acc}$ computed in Equation 3, O2 seeks to satisfy latency goals by minimizing the distance to the value of $n^{lat}$ computed in Equation 4, and O3 seeks to limit the maximum volume of

TABLE 2

Variables used in optimization formulation of scheduling problem. The sole outputs $d_{i,j}$ determine the schedule for the next epoch.

| Variable | Description |
| --- | --- |
| Q | index set of queries ready for execution |
| SE | index set of subepochs |
| K | index set of all disjoint traffic slices |
| $U_k$ | index set of all update operations in slice k |
| $t_k$ | number of TCAM entries required by slice k |
| $u_i$ | index of update operation required by query i |
| $s_{i,k}$ | indicator that query i requires slice k |
| $m_i$ | memory required in each subepoch by query i |
| $n_i^{acc}$ | number of subepochs required for accuracy goal for query i |
| $n_i^{lat}$ | number of subepochs required for latency goal for query i |
| T | total available TCAM entries |
| A | total number of available switch ALUs |
| M | total available SRAM counters |
| $d_{i,j}$ | indicator that query i executes in subepoch j | data that needs to be returned from the switch in a single subepoch. We expose the Pareto front of these objective functions using linear scalarization which allows operators to express the importance of each objective by submitting weights and is computationally efficient.

Challenges of Online Optimization

Unlike prior work, the inputs to our optimization problem are dependent on task dynamics

TABLE 3

Scheduling problem constraints to respect (C1) TCAM capacity requirement, (C2) switch ALU capacity, (C3) SRAM capacity, and (C4) query minimal progress requirement. I [ ] is the indicator function.

$$C1: \forall\, j \in SE, \sum_{k \in K} t_k I\left[\bigvee_{i \in Q} d_{i,j} s_{i,k} = 1\right] \leq T$$

$$C2: \forall\, j \in SE, k \in K, \sum_{u \in U_k} I\left[\bigvee_{i \in Q} d_{i,j} s_{i,k} I[u_i = u] = 1\right] \leq A$$

$$C3: \forall\, j \in SE, \sum_{i \in Q} d_{i,j} m_i \leq M$$

$$C4: \forall\, i \in Q, \sum_{j \in SE} d_{i,j} \geq 2$$

TABLE 4

Objective functions considered in the multi-objective formulation.

$$O1: \text{minimize} \sum_{i \in Q} \left|\left(\sum_{j \in SE} d_{i,j}\right) - n_i^{acc}\right|$$

$$O2: \text{minimize} \sum_{i \in Q} \left|\left(\sum_{j \in SE} d_{i,j}\right) - n_i^{lat}\right|$$

$$O3: \text{minimize} \sum_{i \in Q, j \in SE} d_{i,j} m_i$$

ics (e.g., the set Q can vary each epoch) and traffic dynamics (e.g., the suggested $n_i^{acc}$ could increase in response to increased traffic variability). Hence, we must solve the optimization problem independently in each epoch. However, invoking an optimization solver in an online scheduling method is fraught with challenges. First, certain combinations of inputs and constraints can lead to infeasible problems where it is impossible to satisfy all constraints. Second, since integer programming is a well known NP-complete problem, finding an optimal solution can take exponential time in the worst case. In what follows, we describe several precautions that we take in the design of our scheduler to ensure these challenges do not adversely affect the performance of the telemetry system.

Dealing with infeasible queries. Our first strategy to deal with infeasible optimization problems is to require that all submitted queries can be executed on the given switch resources in the absence of other queries. In particular, if a query requires more than T TCAM entries, A ALUs, or M counters, the scheduler must reject that query outright, since it will not be able to execute on the given switch hardware. This ensures that our scheduler can always make progress on the current pool of submitted queries by selecting a single query and allocating the full switch resources for all subepochs. We note that a query partition scheme similar to Sonata could be added to our system to handle this case more elegantly.

Dealing with slow optimizations. To deal with the potentially exponential time that could be required to converge to an optimal solution, we limit the duration of time spent in the optimization algorithm to an acceptable fraction of total epoch time. This method, known as early stopping, is a well-known technique to gather feasible, good, if not fully optimal solutions. When the optimization process stops due to this time limit, the current solution must still be checked for feasibility and only allowed to execute if it is, in fact, feasible.

Fail-safe. In cases where the optimization problem is either proven infeasible or times out before converging, we fall back to a simple heuristic "fail-safe" mode of scheduling. We also deny all new query submissions when in fail-safe mode to notify the operator that the system is currently saturated and to prevent the accumulation of a large backlog which could cause the optimization problem to remain infeasible in future epochs. Our simple heuristic fail-safe scheduling scheme greedily selects the query closest to its deadline and allocates this query fully to switch resources. To increase progress in fail-safe mode, we also add other queries that use the same or a subset of the selected query's traffic slices until either the memory or ALU limit is reached. Since queries scheduled in this mode execute for each subepoch, $n_i/N=0$ for that epoch ensuring progress towards accuracy targets, though some queries may suffer increased latency.

Another approach to dealing with situations where a feasible schedule cannot be found is to send slices of traffic to the collector and compute query results in software. In this approach queries running during fail-safe mode could still meet tight latency goals at the expense of increased load on the collector. Depending on the nature of situation triggering fail-safe mode, this could impose infeasible processing loads on the collector or lead to excessive congestion between switch and collector. The inventors envision solutions to this problem including combinations of heuristic scheduling and moving query operations to software.

Evaluation

In this section, we describe our evaluation of DynATOS and demonstrate the following key results.

The time-division approximation technique in DynATOS is more robust than state-of-the-art in the face of traffic dynamics and offers comparable performance to state-of-the-art sketch-based approximate techniques.

The scheduling method in DynATOS handles dynamic query workloads with up to one query every second and leverages specific accuracy and latency goals to reduce per-query resource usage.

Latency overheads in DynATOS are minimal and dependent on the load on the collector and the number of queries which must be updated in switch hardware.

Experimental Setup

Setting. We evaluate DynATOS on a BCM 56470 series System Verification Kit (SVK) switch running BroadScan which implements the telemetry operations. Our version of Broad-Scan has A=8 parallel ALU operators, and a flow table with M≈9 MB of memory. A software agent on the switch's CPU manages reconfiguration of hardware in response to requests from the collector. Our collector and scheduling software runs on a server with an Intel Xeon Gold 5218 CPU at 2.3 Ghz and 383 GB memory. This server is equipped with a 40 Gb Mellanox MT27700-family network card connected directly to the SVK's data plane. A separate 10 Gb Intel X550T network card on the same server connects to the SVK's management interface to manage updates to hardware configuration as schedules execute.

Traces. Unless otherwise stated, we replay a trace from the MAWILab traffic data set (Sep. 1, 2019) using tcpreplay.

We selected this trace as a baseline because some of its features are static while others are more dynamic.

Default parameters. We use five-second scheduling epochs to allow sufficient measurement duration without incurring excessive delay of results which must wait for epoch boundaries. We divide epochs into N=8 subepochs so that the schedule has sufficient options for arranging queries without making subepochs too short to generate useful samples. We set objective weights to balance between priorities and suppose queries will get all future subepochs when evaluating Equation 4. Queries are submitted with realistic values of a based on baseline measurements of their variances in the trace. We set $\alpha=\frac{1}{2}$ in the EWMA estimation described in the section on Optimization Formulation. Bars show median and error bars show $5^{th}$ and $95^{th}$ percentiles over all epochs of the trace.

Query workloads. We use DynATOS to implement four of the telemetry queries originally introduced by Sonata and used in several recent efforts. Our hardware model handles a fixed sequence of filter and reduction operations so we implement the remaining query operations in software. This scenario is equivalent to Sonata with a limited number of switch hardware stages. We report the accuracy of approximate implementations of these queries as F1 score (the harmonic mean of precision and recall) by comparing against ground truth computed offline. In addition to static queries, we generate dynamic query workloads based on random processes to evaluate DynATOS. To the best of our knowledge, there is no comparable publicly-available dynamic query workload benchmark. Our workloads are publicly released at to support validation of our results and to facilitate benchmarking of similar systems in the future.

Implementation. We implement the DynATOS scheduler in ~14 k lines of C and C++. Following ProgME, we use BDDs to represent query filter conditions in our implementation of the DISENTANGLE algorithm. We use the open source CBC implementation to solve the optimization problems described above. Our implementation also defers some result processing operations to the time spent waiting for results from switch hardware to improve efficiency.

Comparisons. We compare DynATOS with ElasticSketch, Newton, and SketchLearn. We modified the implementations of both ElasticSketch and SketchLearn to support the filter and reduce operations required by several of the Sonata queries. Though we were unable to locate a publicly available implementation of Newton, we implemented its sketch-based approach to approximating Sonata's primitive operators. In particular, we use count-min sketch to approximate the reduce operator and a bloom filter to approximate the distinct operator.

Performance of Time-Division Approximation

Figure 4:
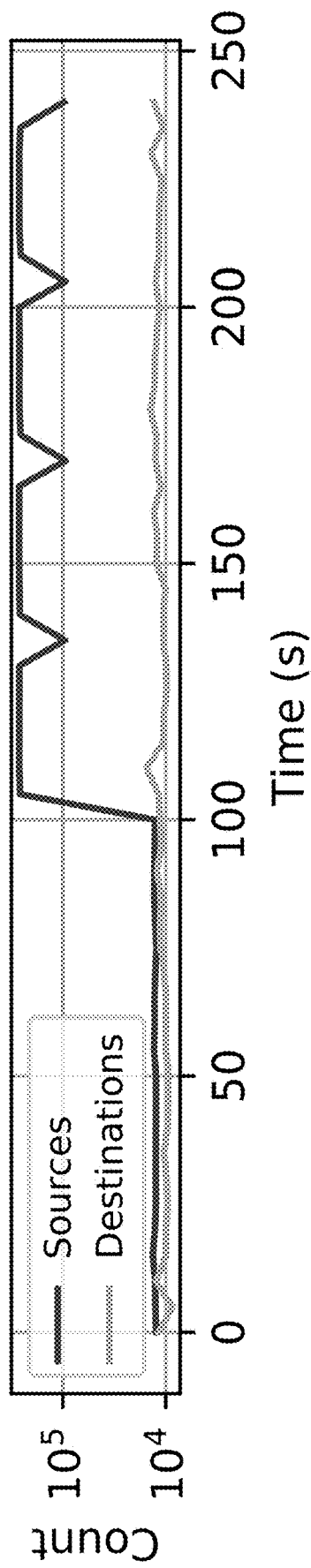
FIG. 4 is a graph of distinct sources and destinations as a function of time from an excerpt of a MAWILab dataset, according to an embodiment of the invention.

Robustness in the face of traffic dynamics. To address the question of what happens when traffic composition changes significantly we consider an excerpt from the MAWILab dataset taken on Nov. 14, 2015. As shown in FIG. 4, this excerpt features nominally static traffic followed by a dramatic surge in the number of sources around 100 seconds into the trace.

To understand how different methods handle this change in traffic dynamics, we first tune each method's parameters to achieve high accuracy (F1>0.9) on the first 100 seconds of the excerpt, then run the method with these parameters over the entire excerpt. Since it is possible that this anomaly was cause by some form of DDoS attack, we run the DDoS query in this scenario to locate the victim of the attack. This is intended to reflect a realistic situation where a method was deployed and tuned for a particular traffic composition, which then changes. In real deployments, such changes could be caused by attacks or performance anomalies and represent the moments when data collected from a telemetry system is most critical.

Figure 5:
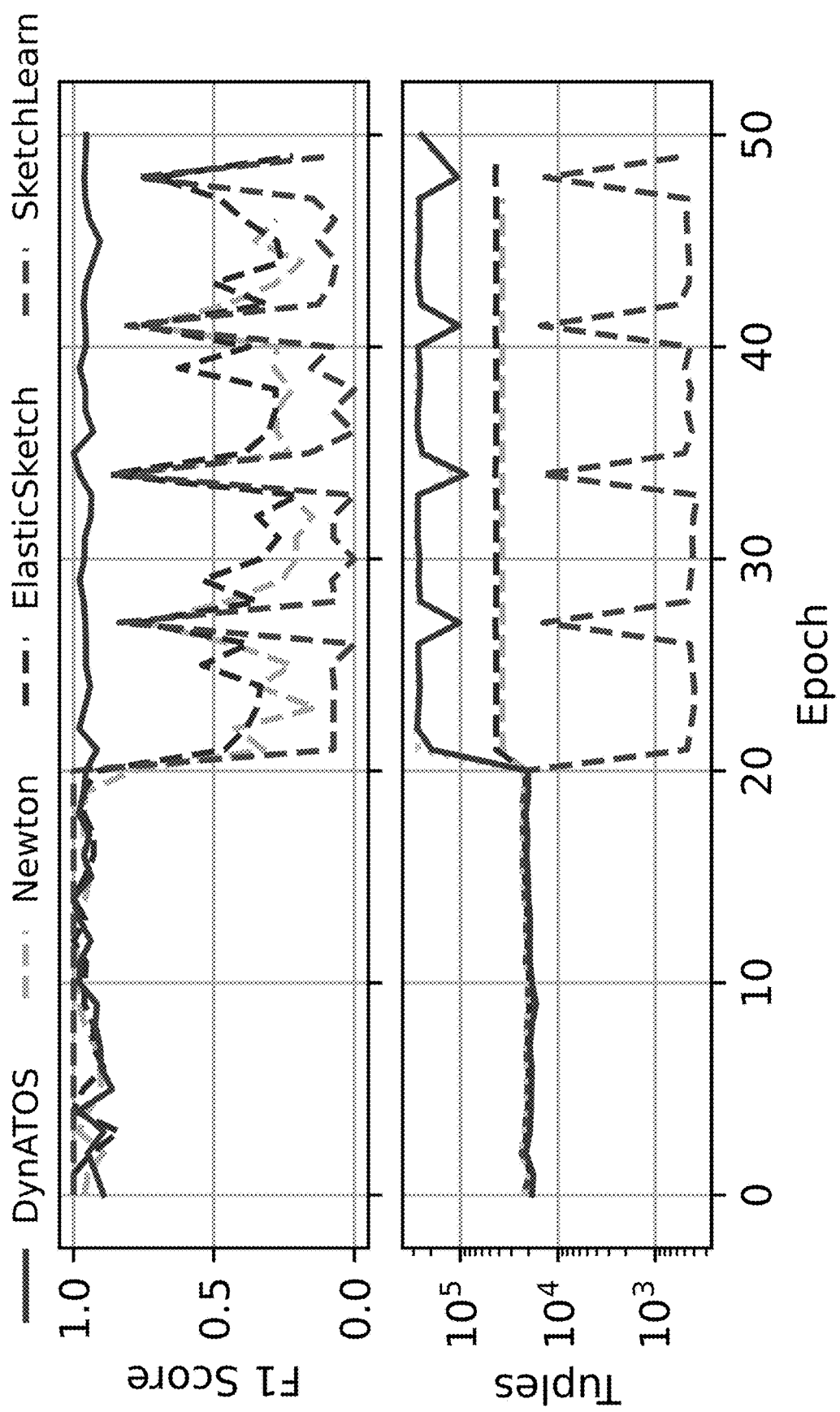
FIG. 5 shows graphs of F1 score and tuples returned to the collector for each epoch, illustrating the performance of different methods on the MAWILab excerpt shown in FIG. 4, according to an embodiment of the invention.
Figures 6A, 6B:
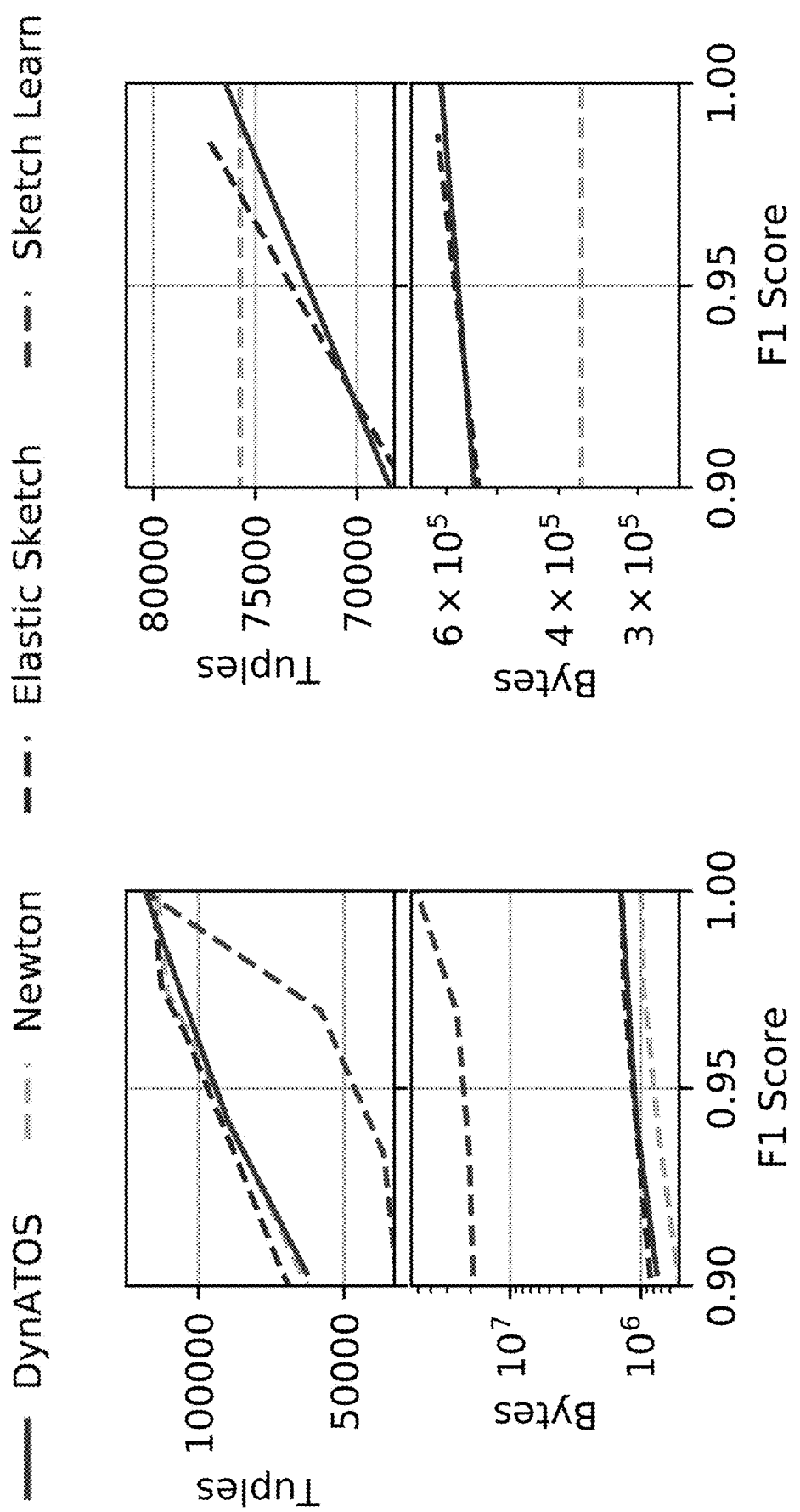
FIG. 6A, 6B, 6C, 6D each show graphs of bytes and tuples vs. F1 score, illustrating accuracy vs. overhead curves, where
Figures 6C, 6D:
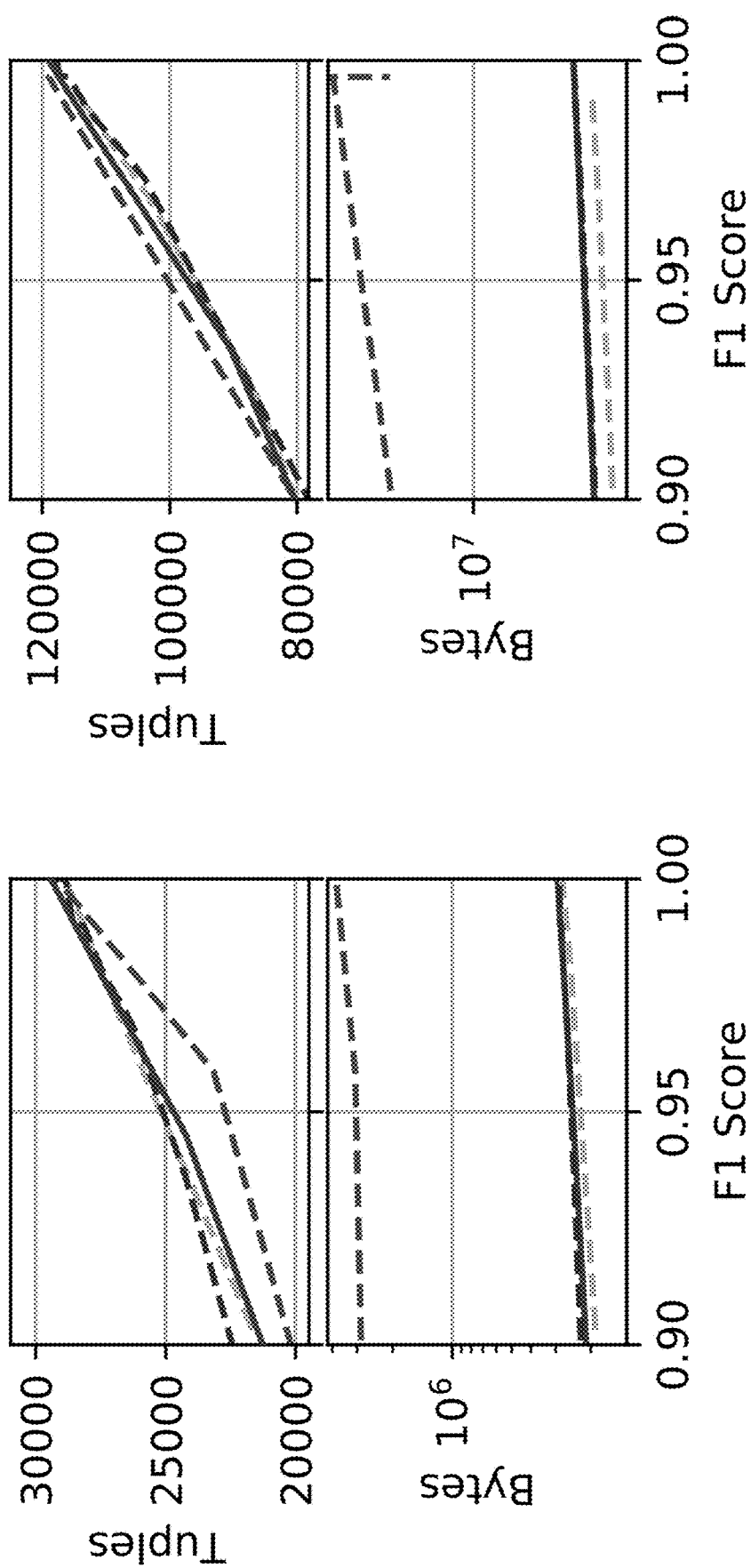

FIG. 5 shows the F1 score and number of tuples returned to the collector in each epoch over the trace excerpt. All methods achieve high accuracy for the first 20 epochs, but then when the number of sources increases after the $20^{th}$ epoch, they diverge significantly. First, we note that DynATOS is able to maintain high accuracy where other methods suffer by dynamically increasing the load on the collector. This is a result of the natural robustness of our non-parametric sampling method: when the underlying traffic composition changes, those changes are reflected in each sampled subepoch causing the volume of data reported for each subepoch to increase to ensure steady accuracy.

The sketch-based methods in ElasticSketch and Newton, on the other hand, are limited by the static table sizes configured for the first 20 epochs: once the traffic composition changes, these tables become saturated and excessive hash collisions lead to F1 scores below 0.5. We confirm that the average number of hash collisions per epoch jumps by 2× when the traffic distribution changes in epoch 21. We note that these sketch-based methods also offer no easy way to estimate the accuracy of returned results, so while an operator may become suspicious due to the slight increase in load on the collector, they would have no way to verify that the accuracy of these methods is compromised.

Sketchlearn differs from other methods in that it reconstructs flow keys based on data stored in a multi-level sketch. Sketchlearn guarantees only that it will be able to extract all flows that make up more than 1/c of the total traffic where c is the fixed number of columns in the sketch. We confirm that in this trace, the increased number of sources is caused by a large number of small flows (one to two packets). As such, the threshold to be extracted increases, but none of the added flows are able to meet it and so SketchLearn is unable to extract existing as well as new flows with high enough confidence. SketchLearn does associate accuracy estimates with these results so an operator could be notified of this situation, but would have to reload their switch's pipeline with a larger value of c in order to achieve acceptable accuracy.

Overall accuracy-load tradeoff. As in previous efforts, we consider the volume of data returned from switch hardware to the collector (i.e., load on the collector) as a critical resource. Each approximation method can reduce this load while reducing accuracy of query results, leading to a performance curve in accuracy vs. load space. To empirically estimate this curve, we determine several different parameterizations of each method, execute the method with each parameterization over all epochs of the trace, then compute the accuracy and load on collector in each epoch. For some queries the sketch-based methods must export their full sketches to the collector so we report load in terms of both tuples (the number of records or events) and bytes (the total size of data). We use the median of each value over all epochs to estimate the empirical performance curves.

FIG. 6A, 6B, 6C, 6D show performance curves for four different queries with two plots for each query showing overhead as tuples and bytes on the y-axis. Here we use the baseline MAWILab trace so these results represent a mostly static traffic scenario. Note that the lower right-hand corner of these plots is ideal with maximal accuracy and minimal load. We observe that DynATOS' novel approximation method performs as well as, if not better than other methods. The sketch-based method proposed by Newton achieves slightly better performance in terms of total data volume on the DDoS and Super Spreader queries because it only sends flow keys from the first distinct operator whereas other methods also return a counter. SketchLearn requires relatively large multi-level sketches to be exported each epoch in order to achieve comparable accuracy on these queries despite it's lower tuple counts. In the case of TCP new connections, we were unable to run a large enough sketch to reach the accuracy range shown here for other methods. We observe that for the TCP new connections query Newton's count-min sketch is highly sensitive to sketch size. For example, adding a single additional counter moves the F1 score across the entire range shown in the plot. DynATOS, on the other hand, achieves comparable if not higher performance and offers a wider range of load savings.

Performance of Scheduling Algorithm

Dynamic Query Workload

Real telemetry system deployments must deal with dynamics in the number and types of queries submitted to the network over time. Since, to the best of our knowledge, no representative dynamic query workloads are available, we synthesize such workloads based on the following scheme. First, we generate a series of base queries with random aggregation keys and granularities and arrival times based on a Poisson process with rate $\lambda$. We suppose these base queries are submitted by a human operator or automated process which then submits followup queries based on base query results. In particular, when each base query terminates, we submit between 0 and 3 followup queries with the same aggregation as the base query, but filters added to select a single aggregation group from the base query's results. For example, if a base query with aggregation key source IP address at 8 bit granularity returned results for 0.0.0.0/8, 10.0.0.0/8, and 192.0.0.0/8, we might submit followup queries to monitor just 10.0.0.0/8 and 192.0.0.0/8. To provide contrasting accuracy and latency goals, base queries are submitted with looser accuracy goals ($\sigma=100$) and latency goals randomly chosen within a range of 1 to 5 epochs, while followup queries are submitted with tighter accuracy goals ($\sigma=50$) and a latency goal of 1 epoch.

Figure 7:
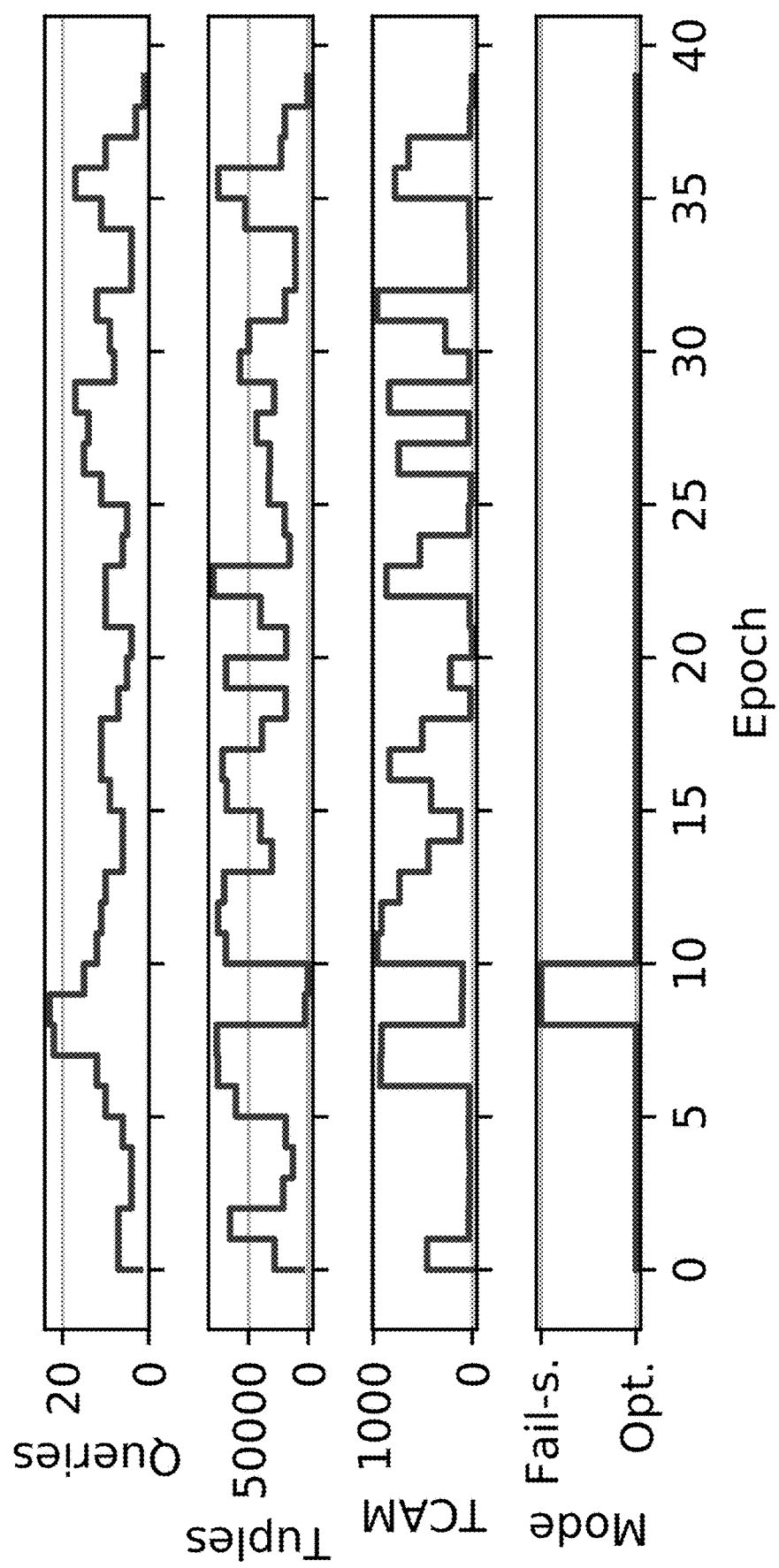
FIG. 7 shows graphs of mode, TCAM, tuples, and queries as a function of epoch, illustrating an example time-series of a dynamic query workload, according to an embodiment of the invention.

FIG. 7 shows the evolution of the number of queries submitted by one of our dynamic query workloads (top plot) and traces of different operating metrics (lower three plots). In this workload, the maximum number of queries is submitted in epoch 8 which leads to an infeasible schedule since too many TCAM entries are required to keep track of all filter groups of followup queries. This causes our scheduler to enter fail-safe mode for two epochs to dispatch with the excess queries. Note that the heuristic algorithm currently used to select queries in fail-safe mode only selects a few queries based on fully disjoint traffic slices leading to reduction of load on collector and TCAM utilization. Under the software-based fail-safe mode mentioned in the section Challenges of Online Optimization, the load on collector would continue increasing here while TCAM utilization would drop.

Figure 8:
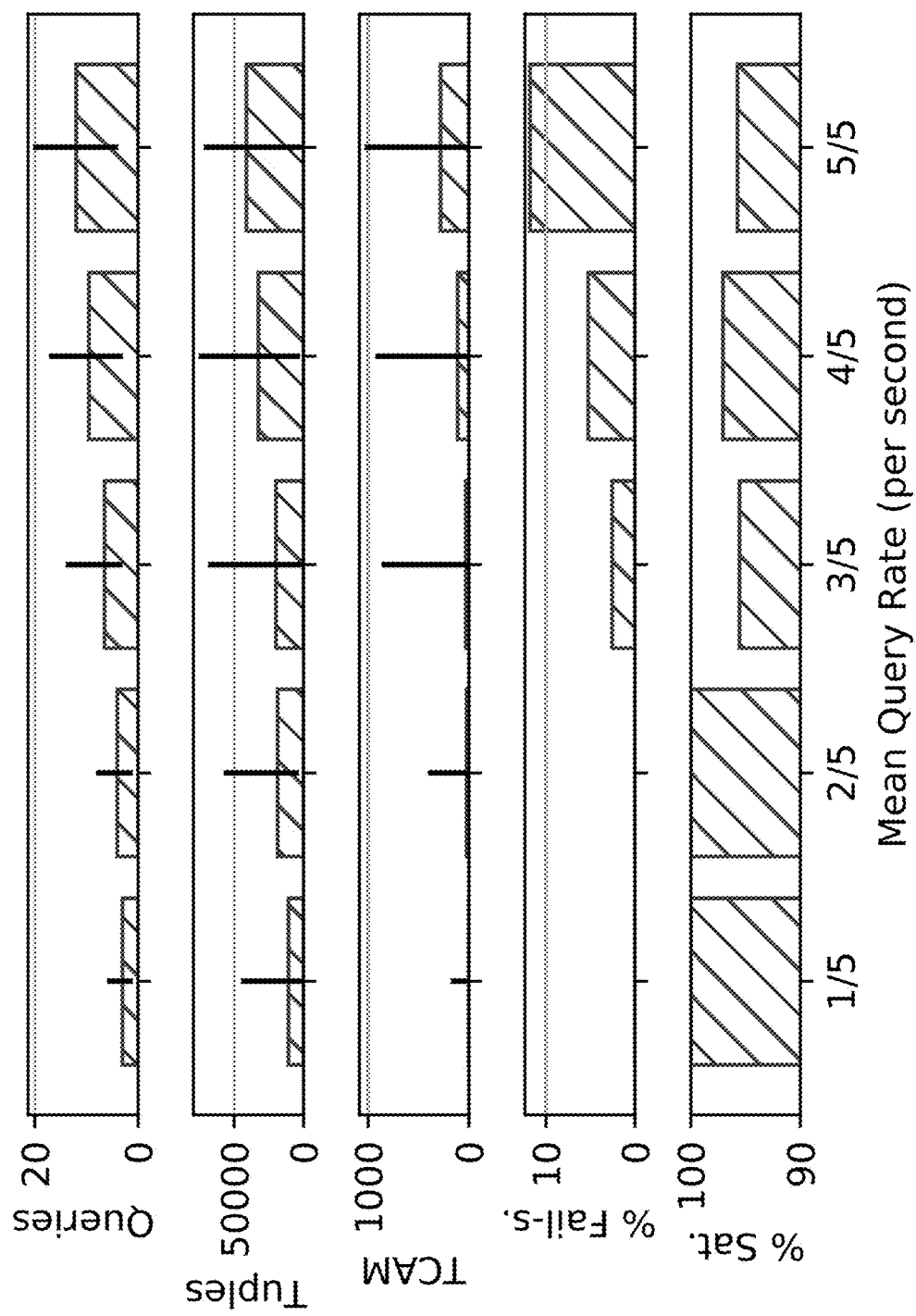
FIG. 8 shows graphs of queries, tuples, TCAM entries used, epochs spent in fail-safe mode (% Fail-s.), and the percentage of satisfied queries (% Sat.) all per-epoch, illustrating performance of DynATOS on dynamic query workloads, according to an embodiment of the invention.

To understand how DynATOS scales with the rate of dynamic query workloads, we generate a set of five workloads with different base query arrival rates. FIG. 8 shows how these different workload intensities affect the performance of DynATOS in terms of queries served (Queries), tuples emitted to the collector (Tuples), TCAM entries used (TCAM), epochs spent in fail-safe mode (% Fail-s.), and percentage of satisfied queries (% Sat.) all per-epoch.

We count the number of queries satisfied as the total number of queries that received valid results during the workload run. Note that some queries submitted when the scheduler is in fail-safe mode are denied at submission time allowing an operator to re-submit these queries later. In these experiments we observe that all successfully submitted queries receive results within their target accuracy and latency goals.

We observe that, as expected, the number of queries serviced, load on collector, and number of TCAM entries required all scale linearly with the base query rate. As also expected, the number of queries satisfied decreases as more epochs are spent in fail-safe mode. We observe that the main contributor to infeasible scheduling problems in this scenario is the number of TCAM entries required to satisfy followup queries' filter conditions. The inventors envision integration of more efficient TCAM allocation algorithms to address this bottleneck.

Relaxation of accuracy & latency goals. Next, we evaluate how our approximation and scheduling method is able to reduce the per-query resource requirements in response to relaxed accuracy and latency goals. We execute the TCP new connections query with varying accuracy and latency goals and measure resource usage over 10 epochs at each setting. Here we report ALU-seconds and counter-seconds which combine both the number of ALUs (or counters) used by the query and the duration for which these resources were used.

Figures 9A, 9B:
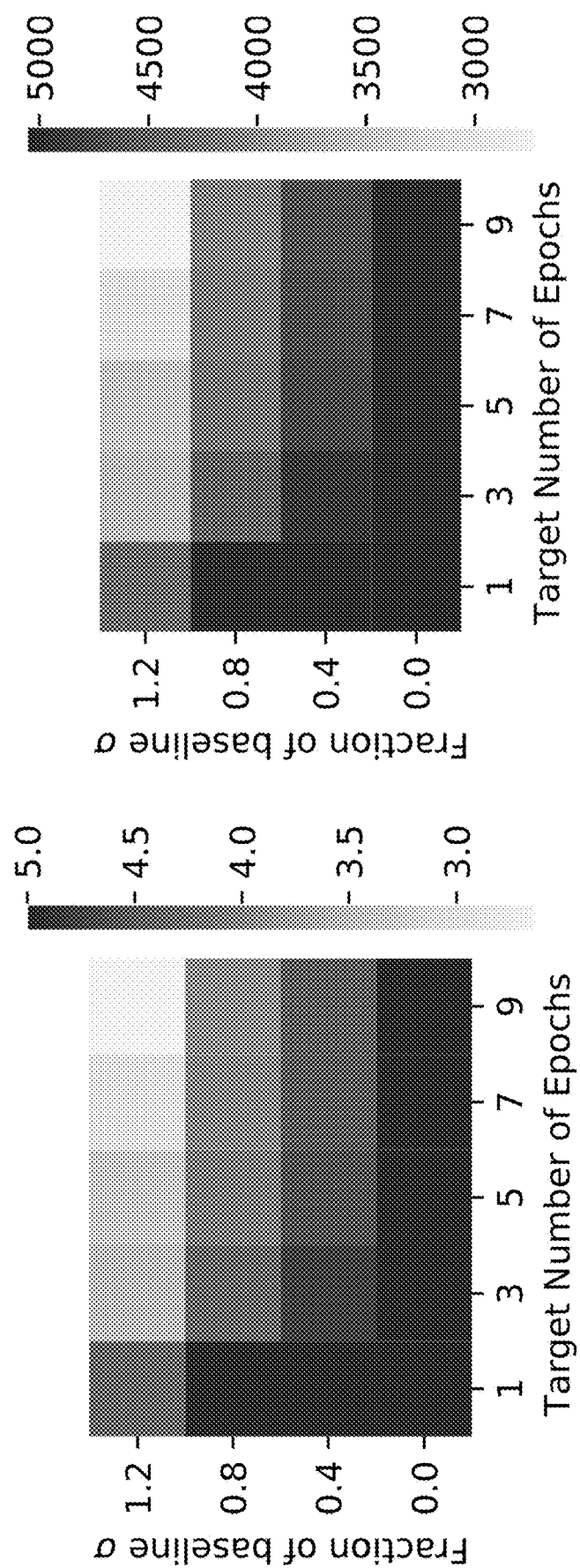
FIG. 9A, 9B are plots illustrating evaluation of median resource usages for selected accuracy (y-axis) and latency (x-axis) targets for a single query. Lighter shades indicate lower resource usages, where

FIG. 9A, 9B show the resulting resource usages as both accuracy and latency goals vary in the form of heatmaps, where lighter shades indicate lower resource usages. These results demonstrate that both accuracy and latency goals can help DynATOS leverage our time-division approximation method to reduce resource requirements.

Scheduling Loop Overheads

Closed-loop systems like DynATOS must quickly gather results and update switch hardware configurations between each subepoch in order to avoid missing potentially critical traffic. We define the inter-epoch latency as the total time spent not waiting for results from switch hardware. In other words, the inter-epoch latency is the total time taken by our system to gather results, reconfigure hardware operations, and decide which operations to execute in the next epoch. We observe two distinct factors that contribute to the inter-epoch latency: the load on the collector and the number of queries installed in switch hardware.

Latency vs. load on collector. The first factor contributing to inter-epoch latency is the volume of data that must be returned and processed after each subepoch. To isolate this effect, we generate synthetic traffic consisting of a certain number of sources each sending a steady stream of packets controlled by a Poisson process. We then run a query that returns a single record for each source so that by varying the number of sources in the traffic, we directly control the number of records returned and hence the load on collector.

Figures 10A, 10B:
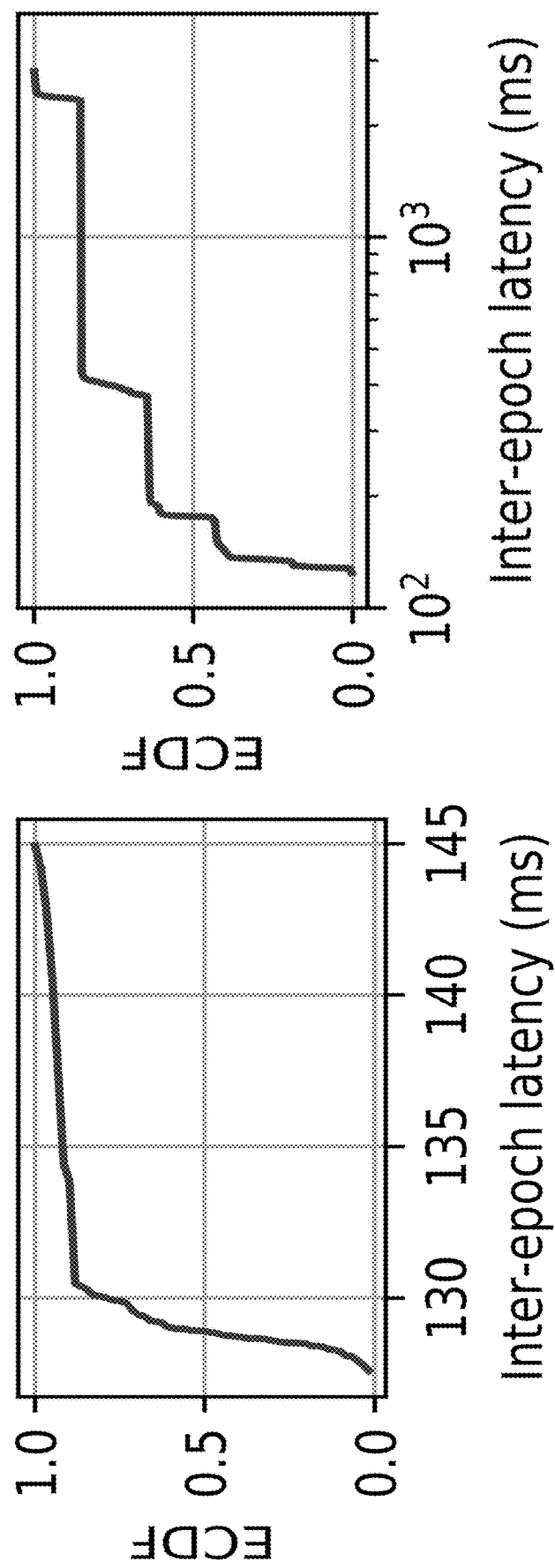
FIG. 10A, 10B are graphs of ECDF vs inter-epoch latency, illustrating the distribution of inter-epoch latency in our testbed system for different loads on the collector, where

FIG. 10A, 10B show the distribution of total latency for two different loads. We observe that the median inter-epoch latency in both cases is less than 130 ms, but that with higher load the tail latencies grow to over a second. This is likely due to that fact that the collector code must allocate larger memory blocks to process the increased number of tuples returned from the switch.

Figure 11:
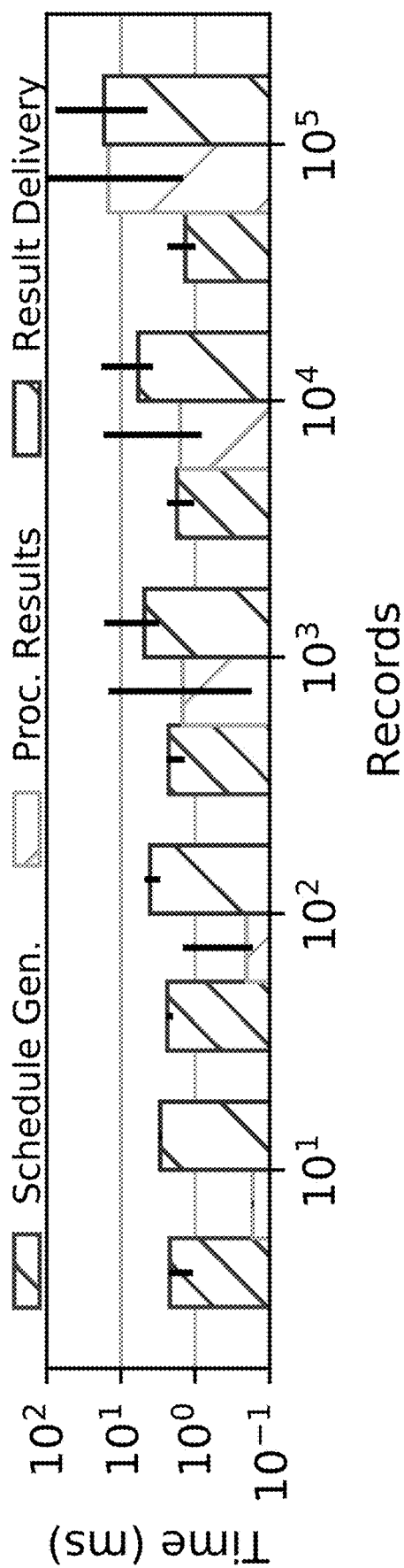
FIG. 11 is a plot of latency time vs. number of records processed, illustrating software overheads as function of tuples exported, according to an embodiment of the invention.

We further investigate how the different components of our query scheduler impact this overall inter-epoch latency by instrumenting the scheduler. FIG. 11 shows the latency break down as a function of the number of records processed for three key components: the time to generate a schedule for the epoch (Schedule Gen.), the time spent processing intermediate results at the end of the epoch (Proc. Results), and the time spent sending results back to the query-submitting process (Result Delivery). The results demonstrate that the main variable software latency is the time to process results which scales nearly linearly with the number of records. A more significant bottleneck is imposed by the result delivery time due to the use of a simple REST protocol which requires new TCP connections and data marshaling via JSON.

Latency vs. number of queries. The second main factor contributing to inter-epoch latency is the time required to install and remove query operations on switch hardware. This factor is influenced primarily by the amount of state which must be written into hardware memory which is a function of the number of queries to be installed or removed. We generate synthetic workloads containing different numbers of disjoint queries based again on the TCP new connections query and instrument our switch agent to measure the time taken by writes into hardware memory.

Figure 12:
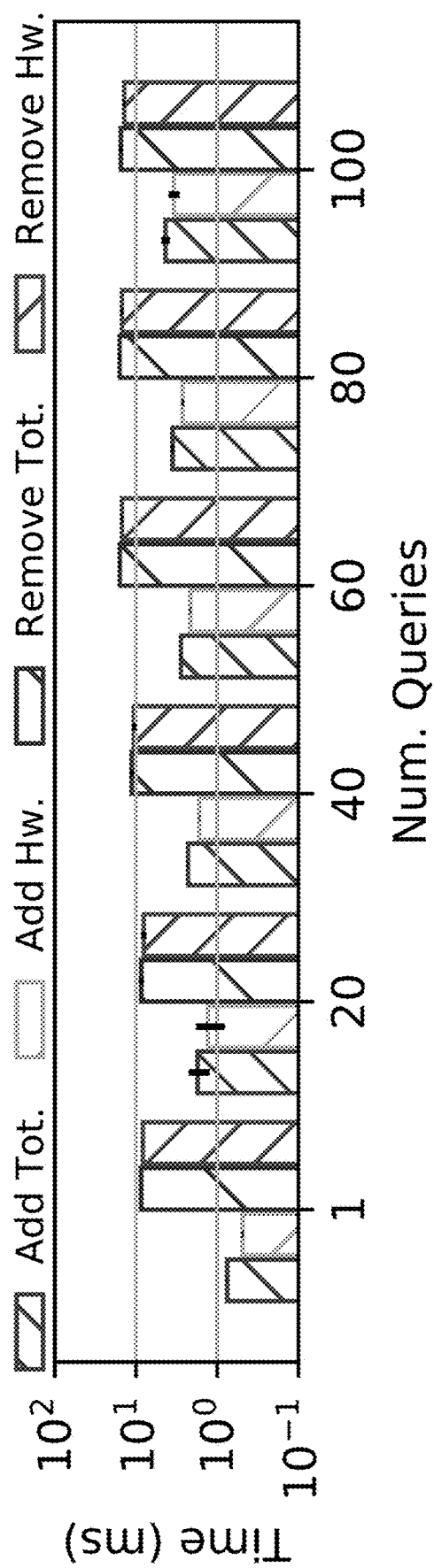
FIG. 12 is a plot of overhead time vs. number of queries, illustrating hardware overheads as function of number of queries, according to an embodiment of the invention.

FIG. 12 shows the time taken by the hardware writes to add and remove operations (Add Hw. and Remove Hw.) as well as the total time taken by the switch agent (Add Tot. and Remove Tot.) which includes the time to deserialize and validate configurations sent from the collector. These results show that up to 100 queries can be added or removed on our prototype in ~10 ms (comparable to latencies reported in prior efforts). We also observe that the deserialization and validation conducted by the switch agent imposes minimal overhead. Finally, the total contribution of switch hardware to the overall inter-epoch latency is dominated by operation removal. This is because when removing operations, the switch agent must also reset the entire flow table used by these operations so as to avoid future operations anomalously reporting leftover results.

Conclusion

Current approaches to telemetry system design struggle to efficiently satisfy dynamism in query workloads and traffic workload composition. By reframing telemetry systems as resource schedulers, in this work, we provide an efficient approximation and scheduling algorithm that exposes accuracy and latency tradeoffs with respect to query execution to reduce hardware resource usage. We evaluate our algorithm by building DynATOS and show that our approach is more robust than state-of-the-art methods to traffic dynamics and dynamic query workloads.

Appendix: Application of Cluster Sampling

In this section, we discuss details of key equations enabling our scheduling approach's accuracy and latency tradeoffs. To maintain a self-contained discussion, some content is repeated from the section on Time-Division Approximation.

Trading Off Accuracy

Given fixed scheduling epochs, we can trade off accuracy for reduced resource requirements by sampling a subset of the subepochs in which to execute a particular query. We leverage cluster sampling theory to expose this tradeoff while maintaining accuracy goals. To simplify our discussion, we first consider the case where a query is executed in a single epoch and then expand to the case where a query is executed across multiple epochs.

Single Epoch Case. Consider the case where a particular query executes in n of the N total subepochs. Our goal is to estimate the value that would have resulted from running the query in all subepochs based only on these n subepoch results. First, we note that each subepoch defines a cluster of packets that traverse the switch during that subepoch. Next, since each query executes over every packet of the subepochs in which it is scheduled, we note that the subepoch results represent a sample of n of the N total subepoch clusters. To ensure that each subepoch has an equal probability of being sampled by a particular query, we shuffle subepochs prior to execution. Cluster sampling theory then lets us estimate the results of these queries over the entire N subepochs as well as the error of this estimator based on the variance between the observed subepochs. For example, we can estimate a query that maintains a sum by $$\hat{t} = \frac{N}{n}\sum_{i \in S} t_i$$

which has standard error $$SE(\hat{t}) = N\sqrt{\left(1 - \frac{n}{N}\right)\frac{s_t^2}{n}}$$

where S is the index set of which subepochs have been sampled, $t_i$ is the query's result in the i-th subepoch, and $s_t^2$ is the sample variance of the $t_i$'s. Clearly, executing a query for fewer subepochs leads to greater sampling error while executing a query in each subepoch leads to zero sampling error. This equation also shows that, if n is set to a fixed ratio of N, error grows as a function of N so we do not expect to increase accuracy by dividing epochs into larger numbers of subepochs. Corresponding theory and equations exist for other update operations such as averages and extreme values.

Multiple Epoch Case. Due to changing traffic distributions or large query workloads, a query may not be able to fulfill its accuracy goal in a single epoch and the scheduler must form results based on the estimates from multiple epochs. Considering again the sum example, let $t_{i,j}$ be the query's result in the i-th subepoch of the j-th epoch, $n_j$ be the number of subepochs in which the query executed in the j-th epoch, and E be the total number of epochs in which the query is executed. By the self-weighting property of $\hat{t}$, we can take a simple mean of the $\hat{t}_j$'s to get an unbiased estimator of the query's result over the E epochs, $$\hat{t}_E = \frac{1}{E}\sum_{j=1}^{E}\hat{t}_j = \frac{1}{E}\sum_{j=1}^{E}\frac{N}{n_j}\sum_{i \in S_j} t_{i,j} \tag{5}$$

which has standard error $$SE(\hat{t}_E) = \frac{N}{E}\sqrt{\sum_{j=1}^{E}\left(1 - \frac{n_j}{N}\right)\frac{s_{t_j}^2}{n_j}} \tag{6}$$

because subepochs are chosen independently in each epoch (i.e., the sampled index sets $S_j$, which are the only random variables in this formulation, are independent).

Application to Scheduling. Our system uses the point estimates provided by Equation 5 to calculate estimated query results. We also utilize Equation 6 for two purposes:

(i) determining when accuracy goals have been fulfilled and (ii) estimating the number of subepochs in which the scheduler must execute particular queries. Since the first item can be evaluated with a simple threshold check, the rest of this section explains the second item. We assume that each query executes a single update operation (e.g., a sum) in its reduction and note that multiple operations could be expressed in multiple queries.

Note that for a given standard error target ($SE(\hat{t}_E)=\sigma$) we can rearrange Equation 6 to solve for the number of subepochs that must be sampled in the E-th epoch as follows, $$n^{acc} = \frac{s_{t_E}^2 N^2}{E^2 \sigma^2 - \left(\sum_{j=1}^{E} \text{Var}(\hat{t}_j)\right) + N s_{t_E}^2} \quad (7)$$

Given a query's target standard error $\sigma$, observed values of $s_{t_j}^2$ and $n_j$ from prior epochs, and an estimate of $s_{t_E}^2$ (based on the $s_{t_j}^2$'s), we can use Equation 7 to determine a lower bound on the number of subepoch in which a query should execute. Note that if $\sigma=0$, then $n^{acc}=N$ and the query will be executed in all of the subepochs in its first epoch. As $\sigma$ increases, $n^{acc}$ decreases freeing more of the subepochs for other queries. For example, FIG. 13A shows the result of evaluating Eq. 7 for the first epoch of a query, indicating that if the accepted standard error is large enough, the scheduler only needs to execute the query in a single subepoch. FIG. 13A, 13B are graphs illustrating numeric evaluations of Eqs. 7 and 8 assuming fixed variance $s_t^2=8$, $N=5$, and queries get $\frac{3}{5}^{th}$ of the subepochs, where FIG. 13A shows increasing $\sigma$ reduces $n^{acc}$ in the first epoch, FIG. 13B shows $n^{lat}$ increases as deadline $E=6$ approaches.

Limitations. We note that Equation 7 can become unstable when the accuracy goal $\sigma$ cannot be obtained in a single epoch given the results of prior epochs. This condition results when $E^2\sigma^2 + N s_{t_E}^2 \leq \sum_{j=1}^{E-1} \text{Var}(\hat{t}_j)$ causing the value of $n^{acc}$ to be negative or undefined. Moreover, when $n^{acc}$ is negative, its magnitude has the wrong sense with respect to $\sigma$: smaller (tighter) values of $\sigma$ reduce the magnitude of $n^{acc}$. Rather than dropping the query, we make a maximum allocation choice ($n^{acc}=N$) and retain the query for future epochs until its accuracy target is met. So long as $\text{Var}(\hat{t}_j) < \sigma^2$ for enough of those future epochs, $n^{acc}$ will eventually stabilize.

Trading Off Latency

In addition to the accuracy tradeoff discussed above, we can tradeoff result latency for reduced resource requirements by executing a query's operations across several epochs. The key observation enabling this tradeoff is that by spreading the sampled subepochs over several epochs, the query can reduce its per-epoch requirements while still attaining its accuracy goal. Operators leverage this tradeoff by specifying larger latency goals on queries which do not require fast returns. We then adapt Equation 6 to estimate how many subepochs should be executed in the current epoch based on both past and anticipated future results.

Accounting for Past and Future Results. Under the latency tradeoff, we approach the problem of determining how many subepochs to execute from the perspective of the point in the future when the query completes. At this point Equation 5 will be used to estimate the query's result and Equation 6 must satisfy the query's accuracy goal. Moreover, assuming we are satisfying the query's latency goal, E is equal to the target number of epochs.

Now we consider the task of estimating the number of subepochs to execute during some epoch e before the query's final epoch E. Note that the sum in Equation 6 can be split around epoch e into a past component $$\text{past} = \sum_{j=1}^{e-1} \left(1 - \frac{n_j}{N}\right) \frac{s_{t_j}^2}{n_j}$$

and a future component $$\text{future} = \sum_{j=e+1}^{E} \left(1 - \frac{n_j}{N}\right) \frac{s_{t_j}^2}{n_j}.$$

We can then directly adapt Equation 7 to provide the required number of subepoch in epoch e accounting for both past and future components as $$n^{lat} = \frac{s_{t_E}^2 N^2}{E^2 \sigma^2 - N^2(\text{past} + \text{future}) + N s_{t_E}^2} \quad (8)$$

FIG. 13B shows the result of evaluating Equation 8 in each epoch leading up to a query's target latency of $e=6$ assuming that the operation gets $\frac{3}{5}^{th}$ of the number of subepochs requested in each epoch. Since in this case, the query is not given its full requested number of subepochs, the target $n^{lat}$ increases dynamically to meet the deadline. This indicates that Equation 8 can dynamically drive scheduling decisions even when its results are not taken literally in each epoch (as may be the case when multiple queries compete for resources).

Figure 14:
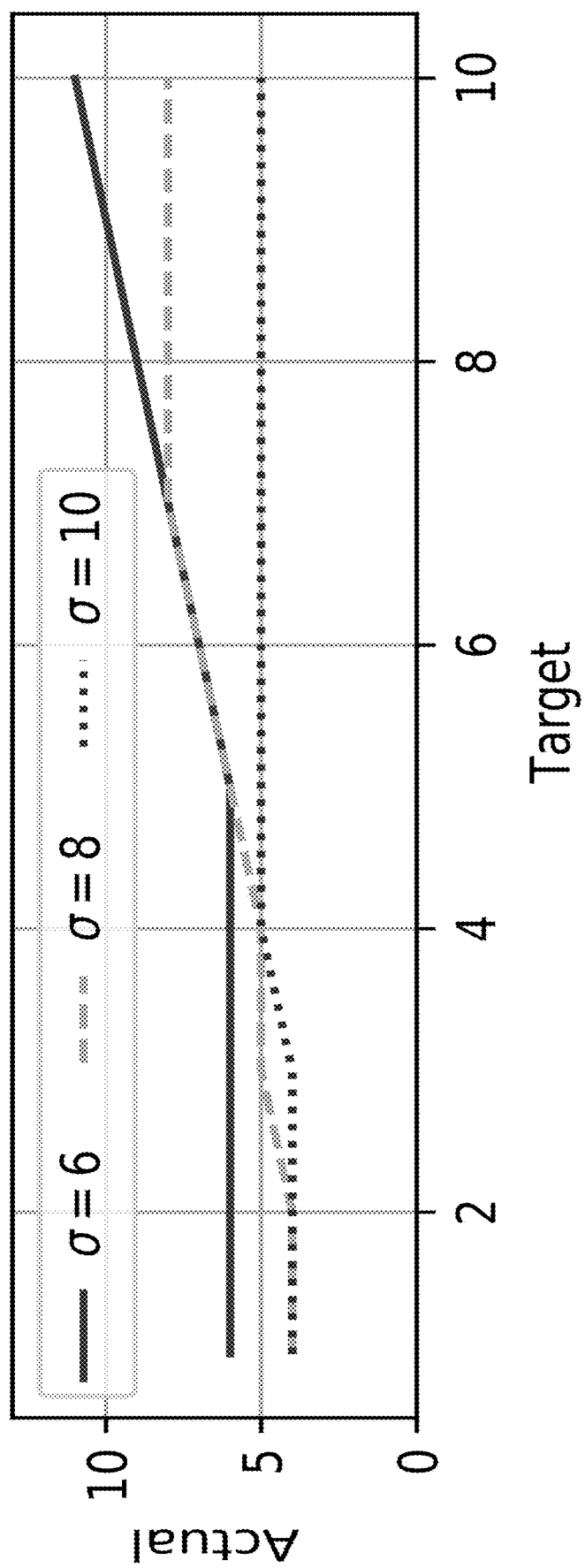
FIG. 14 is a graph of actual target number of epochs vs the actual required number of epochs, according to an embodiment of the invention.

Limitations. Equation 8 faces the same issues as Equation 7 in that it may still be infeasible to satisfy $\sigma$ given past results and the anticipated gains of future results. In such cases we again take $n_j=N$ and count on gaining sufficient resources in future epochs to satisfy the accuracy goal. To understand the dynamics of this decision, FIG. 14 shows the relation between target and actual number of epochs for a number of accuracy goals. We assume here that queries anticipate getting $\frac{3}{5}^{th}$ of the subepochs, actually receive $\frac{3}{5}^{th}$ of what they ask for, and all other settings are as in FIG. 13A, 13B. As can be seen when the accuracy target is too tight (e.g., $\sigma=6$) executing in less than a certain number of epochs ($e=5$) is infeasible and the query's latency goal cannot be met.

Correcting Distinct Operators

Many useful queries also involve identifying and counting distinct elements. We consider the particularly prominent query structure where the results of a distinct operator are fed through a reduce operator with a slightly coarser granularity key. For example, the DDoS query considered in the section above on Dynamic Telemetry Use Cases contains two main stateful operators: (i) finding distinct source, destination pairs and (ii) reducing with destination as the key to count the number of unique sources contacting each destination. The key problem is that, while the methods above provide sound estimators for packet and byte counts, they do not correct for elements which may have been entirely missed in the distinct operator due to sampling. Such errors lead to a downward bias on distinct counts based on sampling which could cause key events like DDoS attacks to go unnoticed. To correct for this source of error, we leverage the Chao estimator without replacement when performing reductions after distinct operators impacted by sampling. Chao estimators are commonly used by "species richness" studies in the biological sciences to solve a related type of distinct count problem.

This estimator is given by $$\hat{S}_{Chao1,wor} = S_{obs} + \frac{f_1^2}{\frac{n}{n-1}2f_2 + \frac{q}{1-q}f_1} \quad (9)$$

where $S_{obs}$ is the number of elements observed in the sample, $f_1$ is the number of elements observed only once, $f_2$ is the number of elements observed only twice, n is the total number of elements in the sample, and q is the sampling rate. To use this estimator, we modify distinct operators executed in the data plane to additionally count the number of packets observed for each distinct element (essentially transforming them into normal count reduction operators). After gathering results, we can then easily compute the inputs required by Equation 9. Note that the variance of $\hat{S}_{Chao1,wor}$ can also be easily obtained from the same information as shown in the original description of this estimator, providing network operators with approximate accuracy of these results as well.

Dataplane Probes

The methods disclosed herein are built around a generic dataplane probe which generates aggregate traffic features from raw network packets and allows updating what features and aggregations are generated with minimal latency at runtime. We now define the capabilities of a dataplane probe through a simple API and associated data structures and provide several example paths to implementation.

Dataplane Probe API

API interface. Dataplane probes implement a simple runtime API with two methods: add-query and remove-query.

The add-query method accepts a data structure specifying query operations (described below) along with a query identifier as arguments. When a probe receives the add-query method, it configures itself to generate features for traffic aggregations as specified in the given data structure and reports results to the central collector.

The remove-query method accepts a query identifier as argument. When a probe receives the remove-query method, it configures itself to no longer generate or report the features associated with the identified query.

Data structures. The primary data structure used in the dataplane probe API is the specification of features and traffic aggregations passed to the add-query method. This data structure has three top-level fields aggregates, features, and report.

The aggregates field specifies both which slices of traffic the query should apply to (e.g., a list of source/destination subnets, a list of IP protocols, a list of TCP flags, etc.) and how traffic should be grouped in these slices (e.g., by source IPv4 address, by IP protocol number, by TCP source/destination port). In stream processing terms, this field specifies a filter and group-by (or key-by) operator configured in series.

The features field specified how the probe should process packets falling into each particular aggregation group. In stream processing terms, this field specifies a grouped reduce operator.

The report field specifies how aggregation results should be reported to the collector, including address information required to reach the collector and mode of reporting (e.g., when the first packet of an aggregation group arrives, once every second, once and only once after half a second).

Example. Consider, for example, a query which counts the number of packets and bytes in each flow sent from a particular subnet and sends a report of these counts once every second. The aggregates field of this query would contain a filter clause describing which packets should be considered as coming from this particular subnet (e.g., IPv4Source in 192.168.0.0/24) as well as a grouping clause describing how to organize packets into aggregation groups (e.g., IPv4Source, IPv4Destination, IPv4Protocol, TCP-SourcePort, TCPDestinationPort). The features field of this query would contain specifications for how to count packets and bytes in each aggregation group (e.g., packets+=1; bytes+=packetLength). The report field would contain a single clause indicating that reports should be sent to the collector once every second. After submitting this query to a dataplane probe via the addquery method, the collector would receive a list of the number of packets and bytes associated with each five-tuple flow once every second until the remove-query method is invoked on the dataplane probe with the same query identifier.

Further requirements. In addition to the above functional requirements, dataplane probes must also adhere to latency and multiplicity requirements. In particular the add-query and remove-query methods must complete as fast as possible, ideally within a number of milliseconds. Additionally, dataplane probes must be able to supply correct results for a large number (e.g., thousands) of independent queries, but may place restrictions on which aggregation groups can be executed concurrently. For example, a dataplane probe may require that all aggregation groups are disjoint.

Example Dataplane Probes

Semi-programmable hardware switching ASIC. Certain dedicated hardware modules in mainstream switching ASICs (e.g., Broadcom's BroadScan, Cisco DNA Traffic Telemetry Appliance) implement the dataplane probe interface.

Fully-programmable hardware switching ASIC. As demonstrated in Newton, commonly used fully-programmable switch hardware can be programmed to implement the dataplane probe interface.

FPGA. By using similar techniques as those employed in fully-programmable switch hardware ASICs, FPGAs can be programmed to implement the dataplane probe interface.

Programmable NIC. Programmable NICs offer many of the same hardware primitives as fully-programmable switch ASICs and can similarly be programmed to implement the dataplane probe interface.

Software switch. By using hash tables and processing logic written in general-purpose programming languages (e.g., C++), software switches (e.g., OVS) can be extended to implement the dataplane probe interface.

Software packet capture. Using similar techniques as described for software switches, the dataplane probe interface can be implemented purely in software and fed traffic through any packet-capture interface. We have developed a reference implementation of the dataplane probe interface that leverages this implementation path and is implemented entirely in the C programming language using the libpcap packet capture library.

The invention claimed is:

1. A computer-implemented method for network dataplane telemetry performed by a scheduler and a runtime component connected to a programmable dataplane device that generates aggregate traffic features from raw network packets in a data network;

the method comprising:
- (a) receiving by the scheduler telemetry queries, where each query of the telemetry queries includes
  - i) a requested network telemetry task expressed as a sequence of filter and reduce operators, and
  - ii) associated query result accuracy and query result latency weights;
- (b) scheduling by the scheduler the telemetry queries to produce a schedule,
  - wherein the scheduling is performed at a start of each processing time window (called an epoch) of a sequence of schedule processing time windows,
  - wherein the epoch is temporally divided into a sequence of equal duration sub-epochs,
  - wherein the schedule assigns a subset of the telemetry queries to each sub-epoch of the sequence of equal duration sub-epochs;
- (c) reprogramming by the runtime component the programmable dataplane device to execute scheduled telemetry queries assigned to each sub-epoch of the sequence of equal duration sub-epochs in accordance with the schedule,
  - wherein the reprogramming is performed for each sub-epoch of the sequence of equal duration sub-epochs;
- (d) collecting and aggregating by the runtime component intermediate query results from the programmable dataplane device,
  - wherein the collecting and aggregating is performed for each sub-epoch of the sequence of equal duration sub-epochs,
  - wherein the intermediate query results comprise aggregate traffic features generated from raw network packets by the programmable dataplane device in response to the scheduled telemetry queries;
- (e) returning by the runtime component aggregated results of completed queries, wherein the returning is performed for each epoch of the sequence of schedule processing time windows;

wherein scheduling the telemetry queries comprises solving a multi-objective optimization problem that uses multiple objective functions weighted by the query result accuracy and query result latency weights associated with the telemetry queries.

2. The method of claim 1 wherein solving the multi-objective optimization problem trades off query result accuracy for reduced resource requirements of the runtime programmable network switch by sampling a subset of the sequence of equal duration sub-epochs in which to execute a particular query, and trades off query result latency for reduced resource requirements of the runtime programmable network switch by executing operations of the particular query across several epochs.

3. The method of claim 1 wherein the programmable dataplane device is a network probe device adapted to generate aggregate traffic features from raw network packets.

4. The method of claim 1 wherein the programmable dataplane device is a semi-programmable hardware switching ASIC, fully-programmable hardware switching ASIC, a FPGA programmed to implement a dataplane probe interface, a programmable NIC, a software network switch, or a network device implementing software packet capture.

* * * * *